United States Patent
Cho

(10) Patent No.: US 11,625,066 B2
(45) Date of Patent: Apr. 11, 2023

(54) FOLDABLE ELECTRONIC DEVICE AND PHOTOGRAPHING METHOD USING MULTIPLE CAMERAS IN FOLDABLE ELECTRONIC DEVICE

(71) Applicant: Samsung Electronics Co., Ltd., Gyeonggi-do (KR)

(72) Inventor: Kwangik Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 150 days.

(21) Appl. No.: 16/932,303

(22) Filed: Jul. 17, 2020

(65) Prior Publication Data

US 2021/0018957 A1  Jan. 21, 2021

(30) Foreign Application Priority Data

Jul. 19, 2019 (KR) .................. 10-2019-0087670

(51) Int. Cl.
*G06F 1/16* (2006.01)
*H04N 5/232* (2006.01)
*G06F 3/14* (2006.01)

(52) U.S. Cl.
CPC .......... *G06F 1/1618* (2013.01); *G06F 1/1641* (2013.01); *G06F 1/1652* (2013.01); *G06F 3/1446* (2013.01); *H04N 5/23238* (2013.01)

(58) Field of Classification Search
CPC .... G06F 1/1618; G06F 1/1641; G06F 1/1652; G06F 3/1446; G06F 1/1647;

(Continued)

(56) References Cited

U.S. PATENT DOCUMENTS 6,807,275 B1  10/2004 Kubo et al.
8,754,961 B2  6/2014 Leskela et al.
(Continued)

FOREIGN PATENT DOCUMENTS

KR  1020130138591  12/2013
KR  1020140046344  4/2014
(Continued)

OTHER PUBLICATIONS

International Search Report dated Sep. 25, 2020 issued in counterpart application No. PCT/KR2020/009473, 11 pages.

*Primary Examiner* — James A Thompson
*Assistant Examiner* — Kim Thanh T Tran
(74) *Attorney, Agent, or Firm* — The Farrell Law Firm, P.C.

(57) ABSTRACT

Disclosed is a foldable electronic device including a first housing, a second housing, at least one first camera module disposed on the first housing to face a first direction, at least one second camera module disposed on the second housing to face the first direction, a first display disposed on the first housing to face a second direction opposite to the first direction and the second housing to face the second direction, a sensor module configured to sense a folding state of the foldable electronic device, a memory, and a processor configured to identify, in response to a photographing request, the folding state of the foldable electronic device based on sensing data obtained from the sensor module, sense a folding angle change of the foldable electronic device based on the identified folding state, obtain, based on the folding angle change, multiple images from each of the at least one first camera module and the at least one second camera module, and process and provide the obtained multiple images.

18 Claims, 16 Drawing Sheets

(58) Field of Classification Search
CPC .... G06F 1/1677; G06F 1/1681; G06F 1/1686; G06F 3/04845; G06F 1/1616; G06F 3/1423; H04N 5/23238; H04N 5/225251; H04N 5/23245; H04N 5/23293; H04N 5/2257; G06T 11/60
USPC .......................................................... 345/659
See application file for complete search history.

(56) References Cited

U.S. PATENT DOCUMENTS

| | | | |
|---|---|---|---|
| 10,635,137 B2 | 4/2020 | Park et al. | |
| 10,904,418 B2 | 1/2021 | Agrawal et al. | |
| 11,016,531 B2 | 5/2021 | Kim et al. | |
| 2010/0316367 A1 | 12/2010 | Kuwahara et al. | |
| 2012/0092482 A1* | 4/2012 | Shinoda | G06T 3/4038 |
| | | | 382/284 |
| 2013/0328764 A1 | 12/2013 | Chon et al. | |
| 2014/0098188 A1* | 4/2014 | Kwak | H04N 5/23238 |
| | | | 348/38 |
| 2014/0101575 A1 | 4/2014 | Kwak et al. | |
| 2014/0320320 A1* | 10/2014 | Wong | G08G 1/167 |
| | | | 340/935 |
| 2015/0009129 A1* | 1/2015 | Song | G06F 1/1684 |
| | | | 345/156 |
| 2016/0050408 A1* | 2/2016 | Lee | H04N 5/2258 |
| | | | 348/47 |
| 2016/0165137 A1* | 6/2016 | Kang | H04N 5/2257 |
| | | | 348/208.4 |
| 2017/0052698 A1* | 2/2017 | Seo | G06F 3/04817 |
| 2017/0075640 A1* | 3/2017 | Chun | G06F 3/0481 |
| 2017/0318226 A1* | 11/2017 | Jung | G06T 7/11 |

FOREIGN PATENT DOCUMENTS

| | | |
|---|---|---|
| KR | 1020140046346 | 4/2014 |
| KR | 1020160021497 | 2/2016 |
| KR | 1020180004395 | 1/2018 |
| KR | 1020180029370 | 3/2018 |

* cited by examiner (610)

(620)

[830]

FOLDABLE ELECTRONIC DEVICE AND PHOTOGRAPHING METHOD USING MULTIPLE CAMERAS IN FOLDABLE ELECTRONIC DEVICE

CROSS-REFERENCE TO RELATED APPLICATION(S)

This application is based on and claims priority under 35 U.S.C. § 119 to Korean Patent Application No. 10-2019-0087670, filed on Jul. 19, 2019, in the Korean Intellectual Property Office, the disclosure of which is incorporated herein by reference in its entirety.

BACKGROUND

1. Field

The disclosure relates generally to an electronic device, and more particularly, to a foldable electronic device and a photographing method using multiple cameras in the foldable electronic device.

2. Description of Related Art

With the development of digital technologies, various types of electronic devices, such as a mobile communication terminal, a personal digital assistant (PDA), an electronic organizer, a smart phone, a personal computer (PC), and a wearable device, are widely used. Hardware and software for such electronic devices are continuously developing in order to support and improve functions of these devices.

For example, a display (or a screen) size of an electronic device has gradually increased, enabling the electronic device to provide various services to a user through a large screen. A shape of the electronic device has become more portable and use of a large-screen display has been simplified. A foldable electronic device a foldable device) is an example of such an electronic device. A foldable device is equipped with a foldable (or bendable) display (e.g. a flexible display) and can be used while being folded or unfolded. Multiple cameras may be mounted on the front and rear surfaces of the foldable device.

A user can take a picture or capture a moving image by using a portable electronic device. With the development of photographing functions of an electronic device, a camera device can perform various types of photographing, such as taking a panoramic picture (or capture image) in which several pictures are connected. Since the size of an image contained in one picture is limited, several static images are separately captured and then combined with each other so as to generate one image. This photographing technique is referred to as "panoramic image capturing".

In order to obtain a panoramic image, a user must sequentially perform photographing while changing the photographing direction of an electronic device or a camera device) at various angles. Therefore, when the user takes a panoramic picture by using an electronic device for providing a panoramic function, it is difficult for the user to capture an image while changing a photographing angle. Conventionally, it is possible for a user to take a panoramic picture while moving (or rotating) an electronic device at a constant speed in a horizontal or vertical direction. However, during a movement of an electronic device, since it is not easy to control the upward/downward or leftward/rightward movement of the electronic device, a distortion phenomenon tends to appear in a panoramic picture.

Thus, there is a need in the art for an apparatus that cures the distortion and image capturing issues of the conventional electronic device.

SUMMARY

Aspects of the disclosure are to address at least the above-mentioned problems and/or disadvantages and to provide at least the advantages described below.

Accordingly, an aspect of the disclosure is to provide a method and a device capable of taking a panoramic picture according to a change in a folding state of a foldable electronic device by using at least two cameras mounted on the rear surfaces of the foldable electronic device.

In accordance with an aspect of the disclosure, a foldable electronic device includes a first housing, a second housing, at least one first camera module disposed on the first housing to face a first direction, at least one second camera module disposed on the second housing to face the first direction, a first display disposed on the first housing to face a second direction opposite to the first direction and the second housing to face the second direction, a sensor module configured to sense a folding state of the foldable electronic device, a memory, and a processor configured to identify, in response to a photographing request, the folding state of the foldable electronic device based on sensing data obtained from the sensor module, sense a folding angle change of the foldable electronic device based on the identified folding state, obtain, based on the folding angle change, multiple images from each of the at least one first camera module and the at least one second camera module, and process and provide the obtained multiple images.

In accordance with another aspect of the disclosure, an operation method of a foldable electronic device including a first housing and a second housing foldable with the first housing includes identifying, in response to a photographing request, a folding state of the foldable electronic device based on sensing data obtained from a sensor module of the foldable electronic device, sensing a folding angle change of the foldable electronic device based on the identified folding state, obtaining, based on the folding angle change, multiple images from each of at least one first camera module arranged on the first housing to face a first direction and at least one second camera module arranged on the second housing to face the first direction, and processing and providing the obtained multiple images.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
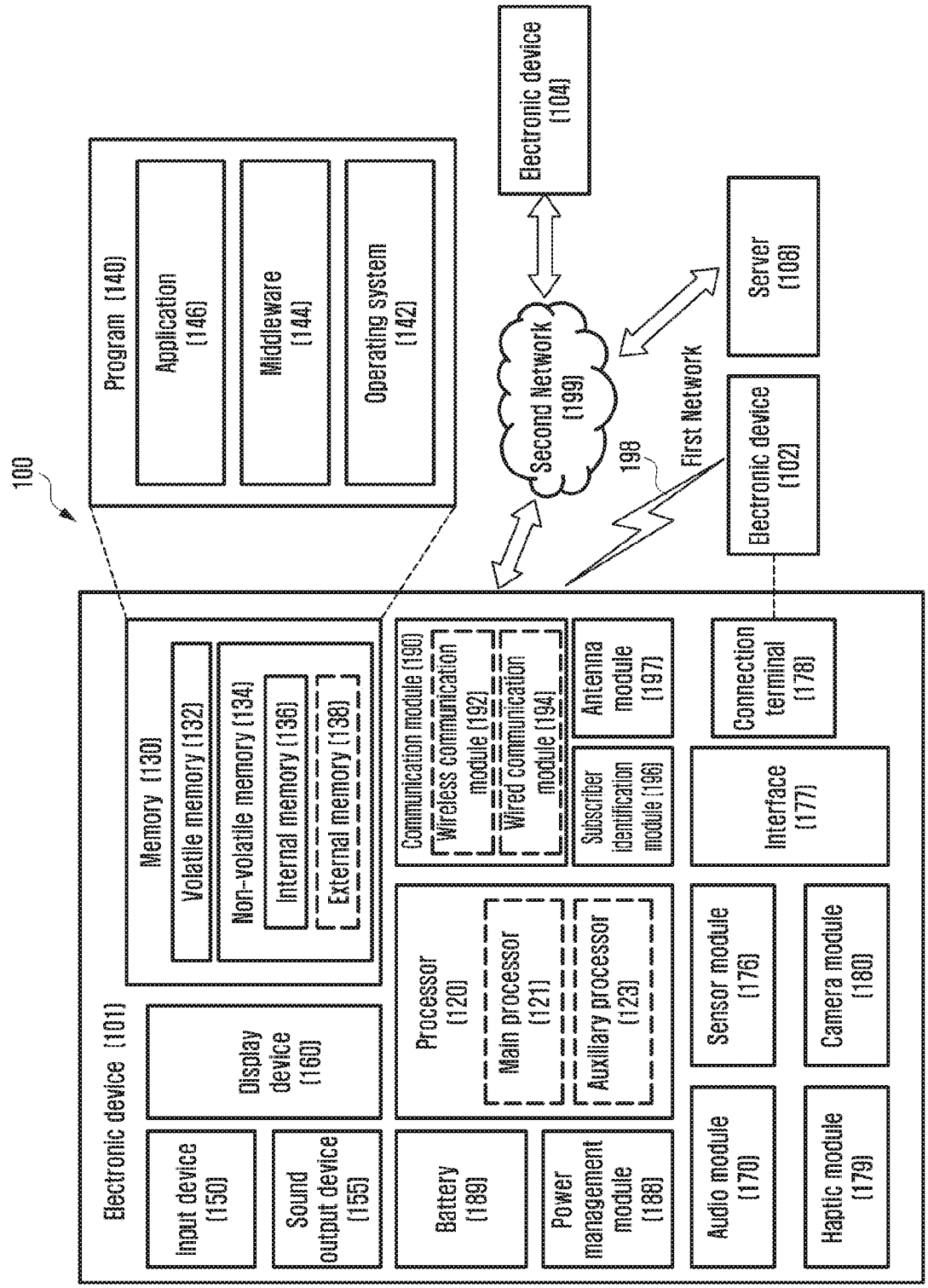
FIG. 1 is a block diagram of a foldable electronic device in a network environment according to an embodiment.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101, The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and Output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101, According to an embodiment, all or some of operations to be executed at the electronic device 101 may be executed at one or more of the external electronic devices 102, 104, or 108, For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
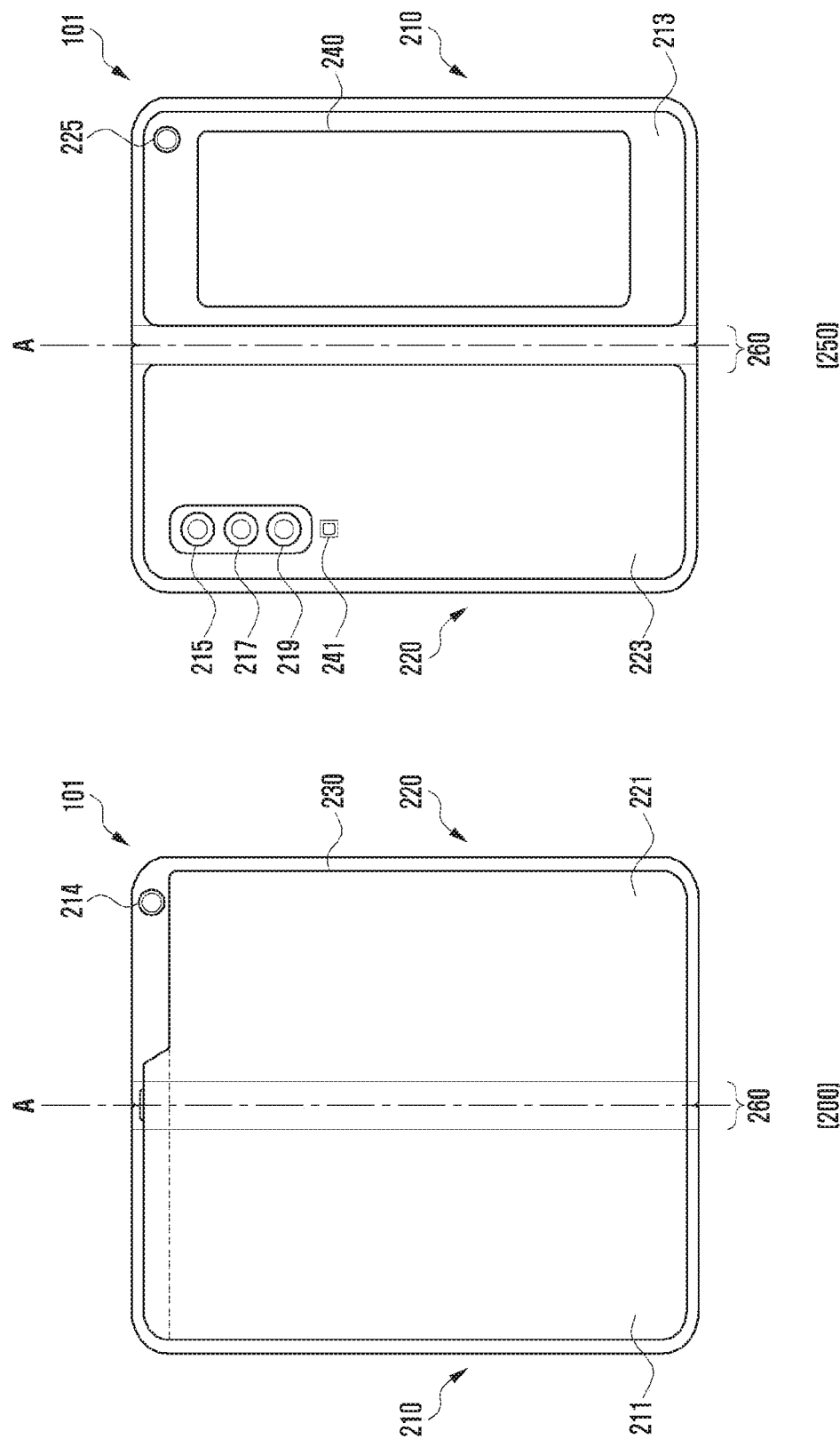
FIG. 2A illustrates an unfolded state of a foldable electronic device according to an embodiment.

FIG. 2A illustrates an open state of an electronic device according to an embodiment.

Referring to FIG. 2A, an electronic device 101 may include a first housing 210 including a first surface 211 and a third surface 213, and a second housing 220 including a second surface 221 and a fourth surface 223. The first surface 211 of the first housing 210 and the second surface 221 of the second housing 220 may indicate a front surface 200 of the electronic device 101, and the third surface 213 of the first housing 210 and the fourth surface 223 of the second housing 220 may indicate a rear surface 250 of the electronic device 101.

The first housing 210 and the second housing 220 may be arranged at both sides of a folding axis (e.g. axis A), and may be generally symmetric with respect to the folding axis. For example, on the front surface 200 of the electronic device 101, the first housing 210 may be disposed at the left side of the electronic device 101 with respect to the folding axis, and the second housing 220 may be disposed at the right side of the electronic device 101 with respect to the folding axis. The first housing 210 and the second housing 220 may be designed to be folded on each other. A hinge structure 260 may be disposed between the first housing 210 and the second housing 220 such that the front surface 200 of the electronic device 101 can be folded.

An angle or distance between the first housing 210 and the second housing 220 may be changed according to whether the electronic device 101 is in an open state, a closed state, or an intermediate state. For example, the open state indicates an opened state, a flat (or even) state, or an unfolding (unfolded) state. The open state may indicate when the first housing 210 and the second housing 220 are arranged side by side, that is, the electronic device 101 is completely unfolded. The open state indicates that the angle between the first housing 210 and the second housing 220 is 180 degrees, and in the open state, the first surface 211 of the first housing 210 and the second surface 221 of the second housing 220 may be arranged to be oriented in an identical direction. FIG. 2A illustrates the front surface 200 of the electronic device 101 and the rear surface 250 of the electronic device 101 if the electronic device 101 is in an open state.

Figure 2B:
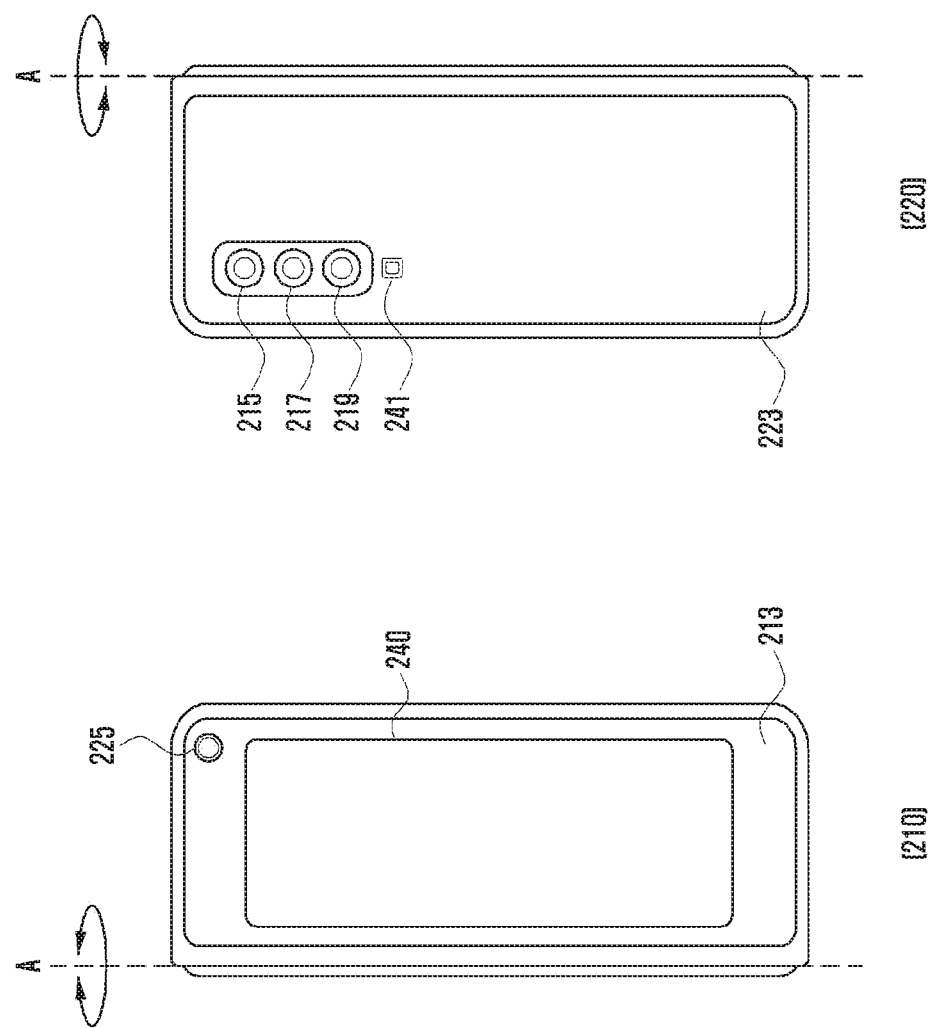
FIG. 2B illustrates a folded state of a foldable electronic device according to an embodiment.

In the closed state, the electronic device 101 may be closed or folded (e.g. FIG. 2B). The closed state may indicate when the first housing 210 and the second housing 220 are arranged to face each other, such that the electronic device 101 is completely folded. The closed state indicates that the angle between the first housing 210 and the second housing 220 is a narrow angle (e.g. 0-5 degrees), and in the closed state, the first surface 211 of the first housing 210 and the second surface 221 of the second housing 220 may face each other. In the following description, the electronic device 101 implemented in an inward-folding type is described, but the following description can be also identically or similarly implemented for the electronic device 101 implemented in an outward-folding type.

The intermediate state may indicate when the first housing 210 and the second housing 220 are arranged to make a particular angle, and in the intermediate state, the electronic device 101 may not be in the open state or the closed state. The intermediate state indicates when the first surface 211 of the first housing 210 and the second surface 221 of the second housing 220 make a particular angle (e.g. 6-179 degrees).

The electronic device 101 may include a first display 230 (e.g. a main display) on the first surface 211 and the second surface 221 that correspond to the front surface 200 of the electronic device. The first display 230 may be disposed over the entirety of the front surface 200 and includes a flexible display, at least a partial region of which is transformable into a flat surface or a curved surface. The first display 230 may be folded to the left and right with respect to a folding axis (e.g. axis A). The first display 230 may include a first display area corresponding to the first surface 211 or a second display area corresponding to the second surface 221. In addition, the electronic device 101 may include a first camera 214 on the second surface 221. FIG. 2A illustrates one first camera 214 but a plurality of first cameras 214 may be arranged. FIG. 2A illustrates the first camera 214 disposed on the second surface 221, but the first camera 214 may be disposed on the first surface 211. The electronic device 101 may further include a sensor module 176 disposed on the front surface 200.

In addition, the electronic device 101 may include a second display 240 on a part of the rear surface 250 of the electronic device. The second display 240 may be disposed on at least a part of the third surface 213 of the electronic device 101. The electronic device 101 may include a plurality of cameras on the rear surface 250 of the electronic device. For example, the electronic device 101 may include a second camera 215, a third camera 217, and a fourth camera 219 which are disposed on the fourth surface 223, and a fifth camera 225 disposed on the third surface 213, which cameras may have an identical or different performance (e.g. angle of view, resolution).

For example, the angle of view of the second camera 215 may exceed 125 degrees (e.g. ultra-wide), the angle of view of the third camera 217 may be 90-125 degrees (e.g. wide), the fourth camera 219 may have an angle of view of 90 degrees with 2× zoom (e.g. Tele), and the fifth camera 225 may have an angle of view of 90 degrees with a normal magnification. When the electronic device 101 is seen in the longitudinal direction, a second camera 215 may be disposed (mounted) at a height similar to a height at which the fifth camera 225 is disposed. The electronic device 101 may further include a sensor area 241 on the fourth surface 223. In the sensor area 241, an infrared sensor, a fingerprint sensor, or an illumination sensor may be disposed similar to the sensor module 176 in FIG. 1.

When the electronic device 101 is in an open state (e.g. FIG. 2A), the first display 230 may be turned on (or activated), and the second display 240 may be turned off (or deactivated). If a user input (e.g. touch, button selection) is not detected during a predetermined time interval (e.g. 5 seconds, 10 seconds, 1 minute) in an ON state of the first display 230, the electronic device 101 may turn off the first display 230. If a user input (e.g. touch, button selection) through the second display 240 is detected in an OFF state of the second display 240, the electronic device 101 may turn on the second display 240. If the second display 240 is turned on, the first display 230 may be turned off. Even though the second display 240 is turned on, the electronic device 101 may maintain an ON state of the first display 230 during a predetermined time interval, and then even after the passage of the predetermined time interval, if a user input is not detected on the first display 230, the electronic device may turn off the first display 230.

When the electronic device 101 is in an intermediate state, turning-on/off of the first display 230 or the second display 240 may be determined according to a folding (or folded) angle. For example, if a folded state is zero degrees and an unfolded state is 180 degrees, when the folding angle is less than or equal to 30 degrees, the first display 230 may be turned off and the second display 240 may be turned on. Alternatively, when the folding angle is greater than or equal to 31 degrees, the first display 230 may be turned on and the second display 240 may be turned off.

The folding angle, in which the first display 230 is turned off and the second display 240 is turned on, may change depending on user configuration or electronic device configuration. For example, when the folding angle is less than or equal to 50 degrees, the first display 230 may be turned off and the second display 240 may be turned on, and when the folding angle is greater than or equal to 51 degrees, the first display 230 may be turned on and the second display 240 may be turned off.

FIG. 2B illustrates a closed state of an electronic device according to an embodiment.

Referring to FIG. 2B, an electronic device may include a hinge structure 260 around a folding axis (e.g. axis A) to allow a folded state (e.g. closed state) of a front surface 200 of the electronic device 101. FIG. 2B illustrates a third surface 213 of a first housing 210 and a fourth surface 223 of a second housing 220 if the electronic device 101 is in a closed state.

When the electronic device 101 is folded, the first display 230 may be turned off and the second display 240 may be turned on. When the second display 240 is turned on, and when user input is not detected for a predetermined time, the electronic device 101 may turn off the second display 240. When the electronic device 101 is folded and the second display 240 is turned off, the electronic device 101 may turn on the second display 240 when a button formed on the electronic device 101 is selected. Alternatively, when the electronic device 101 is folded, when the second display 240 is turned off and then user input is detected on the second display 240, the electronic device 101 may turn on the second display 240.

Figure 3:
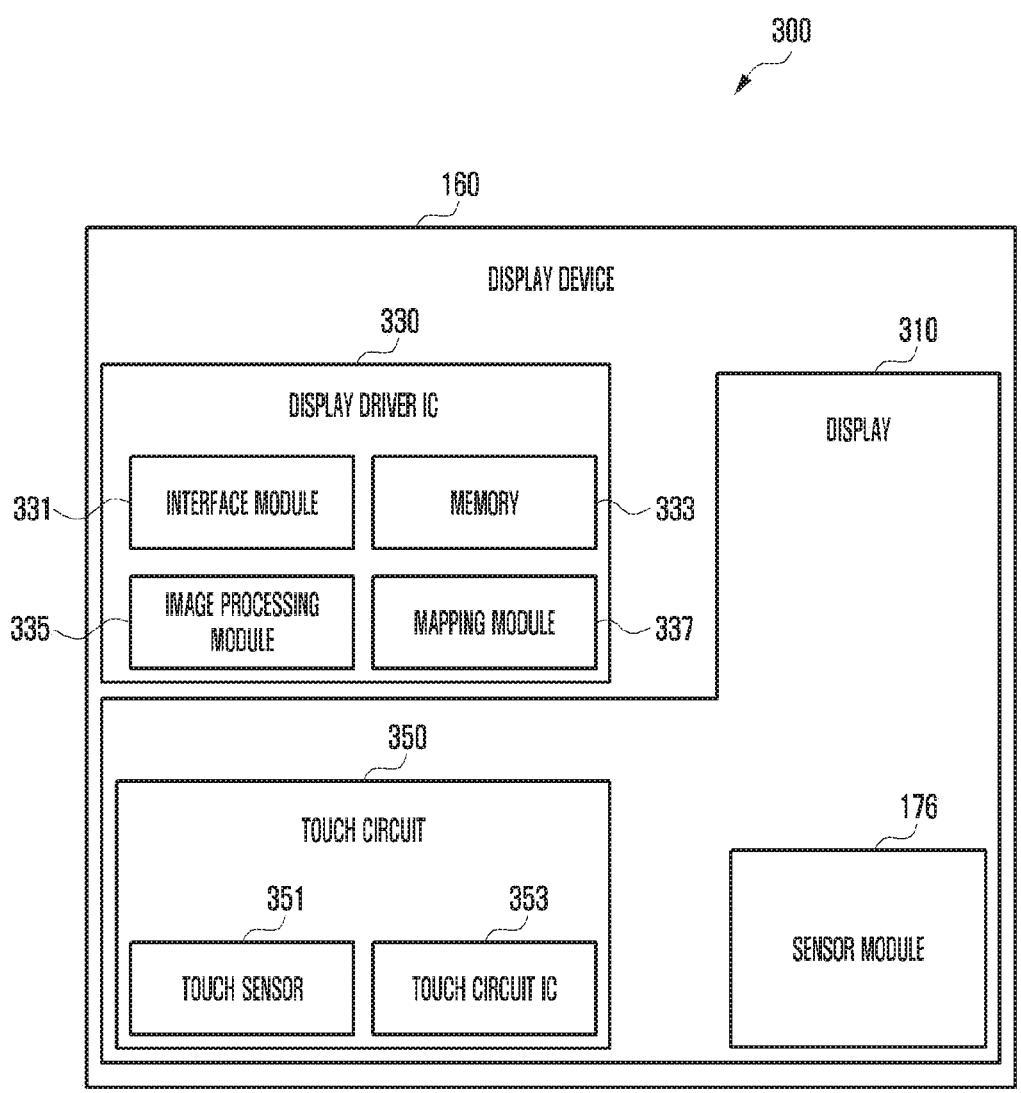
FIG. 3 is a block diagram of a display device according to an embodiment.

FIG. 3 illustrates a block diagram 300 of a display device 160 according to various embodiments.

Referring to HG. 3, the display device 160 may include a display 310 and a display driver IC 330 (DDI, display driver IC) configured to control the display. The DDI 330 may include an interface module 331, a memory 333 (e.g. buffer memory), an image processing module 335, or a mapping module 337.

The DDI 330 may receive image information that contains image data or an image control signal corresponding to a command to control the image data from another component of the electronic device 101 via the interface module 331. For example, image information may be received from a processor 120 (e.g. main processor 121) (e.g. an AP) or an auxiliary processor 123 (e.g. GPU) operated independently from a function of the main processor 121. The DDI 330 may communicate with a touch circuit 350 or a sensor module 176 through the interface module 331. The DDI 330 may store at least a part of the received image information in the memory 333, for example, in the units of frames.

The image processing module 335 may perform pre-processing or post-processing (e.g. adjustment of resolution, brightness, or size), for example, on at least a part of the image data, at least based on a characteristic of the image data or a characteristic of the display 310.

The mapping module 337 may generate a voltage value or a current value corresponding to the image data for which pre-processing or post-processing has been performed through the image processing module 335. According to an embodiment, generation of a voltage value or a current value may be performed, for example, at least partially based on an attribute (e.g. array of pixels (RGB stripe or Pentile structure), or size of each of subpixels) of pixels of the display 310. At least a part of pixels of the display 310 may be operated, for example, at least partially based on the voltage value or the current value to allow visual information (e.g. text, image, or icon) corresponding to the image data to be displayed through the display 310.

According to an embodiment, the display device 160 may further include the touch circuit 350. The touch circuit 350 may include a touch sensor 351 and a touch sensor IC 353 configured to control the touch sensor. The touch sensor IC 353 may control the touch sensor 351, for example, to sense a touch input or a hovering input on a particular position of the display 310. For example, the touch sensor IC 353 may sense a touch input or hovering input by measuring a change of a signal (e.g. voltage, quantity of light, resistance, or quantity of electric charge) relating to a particular position of the display 310. The touch sensor IC 353 may provide information (e.g. position, area, pressure, or time) relating to the sensed touch input or hovering input to the processor 120. According to an embodiment, at least a part (e.g. touch sensor IC 353) of the touch circuit 350 may be included as a part of the DDI 330 or display 310, or a part of another element (e.g. auxiliary processor 123) disposed outside the display device 160.

According to an embodiment, the display device 160 may further include at least one sensor (e.g. fingerprint sensor, iris sensor, pressure sensor, or illumination sensor) of the sensor module 176 or a control circuit for the sensor. In this case, the at least one sensor or control circuit therefor may be embedded in a part (e.g. display 310 or DDI 330) of the display device 160 or a part of the touch circuit 350. For example, if the sensor module 176 embedded in the display device 160 includes a biosensor (e.g. fingerprint sensor), the biosensor may obtain biological information (e.g. fingerprint image) associated with a touch input through a partial area of the display 310. For another example, if the sensor module 176 embedded in the display device 160 includes a pressure sensor, the pressure sensor may obtain pressure information associated with a touch input through a partial area or the entire area of the display 310. According to an embodiment, the touch sensor 351 or the sensor module 176 may be disposed between pixels of a pixel layer of the display 310, on the pixel layer, or under the pixel layer.

A foldable electronic device (e.g. the electronic device 101 in FIG. 1) according to various embodiments includes: a first housing (e.g. the first housing 210 in FIGS. 2A and 2B); a second housing (e.g. the second housing 220 in FIGS. 2A and 2B); at least one first camera module (e.g. the fifth camera 225 in FIGS. 2A and 2B) disposed on the first housing to face a first direction; at least one second camera module (e.g. the second camera. 215, the third camera 217, or the fourth camera 219 in FIGS. 2A and 2B) disposed on the second housing to face the first direction; a first display (e.g. the first display 230 in FIGS. 2A and 2B) disposed on the first housing to face a second direction opposite to the first direction and the second housing to face the second direction, a sensor module (e.g. the sensor module 176 in FIG. 1) configured to sense a folding state of the foldable electronic device; a memory (e.g. the memory 130 in FIG. 1); and a processor (e.g. the processor 120 in FIG. 1), wherein the processor may be configured to identify, in response to a photographing request, the folding state of the foldable electronic device based on sensing data obtained from the sensor module, sense a folding angle change of the identified foldable electronic device, obtain, based on the folding angle change, multiple images from each of the at least one first camera module and the at least one second camera module, and process and provide the obtained multiple images.

The processor may be configured to obtain a first image from the at least one first camera module and a second image from the at least one second camera module when the foldable electronic device changes to a first folding angle, and obtain a third image from the at least one first camera module and a fourth image from the at least one second camera module when the foldable electronic device changes to a second folding angle.

The processor may be configured to generate a panoramic image by using at least one among the first image, the second image, the third image, or the fourth image.

The foldable electronic device further includes: a second display (e.g. the second display 240 in FIGS. 2A and 2B) disposed on the first housing to face the first direction, wherein the processor may be configured to display the processed images on the first display or the second display.

The processor may be configured to display the processed images through the first display when the foldable electronic device is unfolded, and display the processed images through the second display when the foldable electronic device is folded.

The processor may be configured to determine whether the folding angle change of the foldable electronic device is completed or whether panoramic image generation is possible, and generate, based on a result of the determination, a panoramic image using the obtained multiple images.

The processor may be configured such that panoramic image capturing starts in response to the folding angle change.

The at least one second camera module includes at least one among a second camera module (e.g. the second camera 215 in FIGS. 2A and 2B), a third camera module (the third camera 217 in FIGS. 2A and 2B), or a fourth camera module (e.g. the fourth camera 219 in FIGS. 2A and 2B). The processor may be configured to select the second camera module from among the at least one second camera module based on the at least one first camera module, and obtain multiple images from the at least one first camera module and the selected second camera module.

The processor may be configured to obtain multiple images from at least one among the at least one first camera module, the second camera module, the third camera module, or the fourth camera module.

The processor may be configured to identically configure a camera attribute of the at least one first camera module and a camera attribute of the at least one second camera module, and obtain multiple images from the at least one first camera module and the at least one second camera module.

The processor may be configured to generate a panoramic image by removing an overlapping region from the obtained multiple images.

The processor may be configured to receive an editing request from a user, and edit the processed images based on the editing request.

Figure 4:
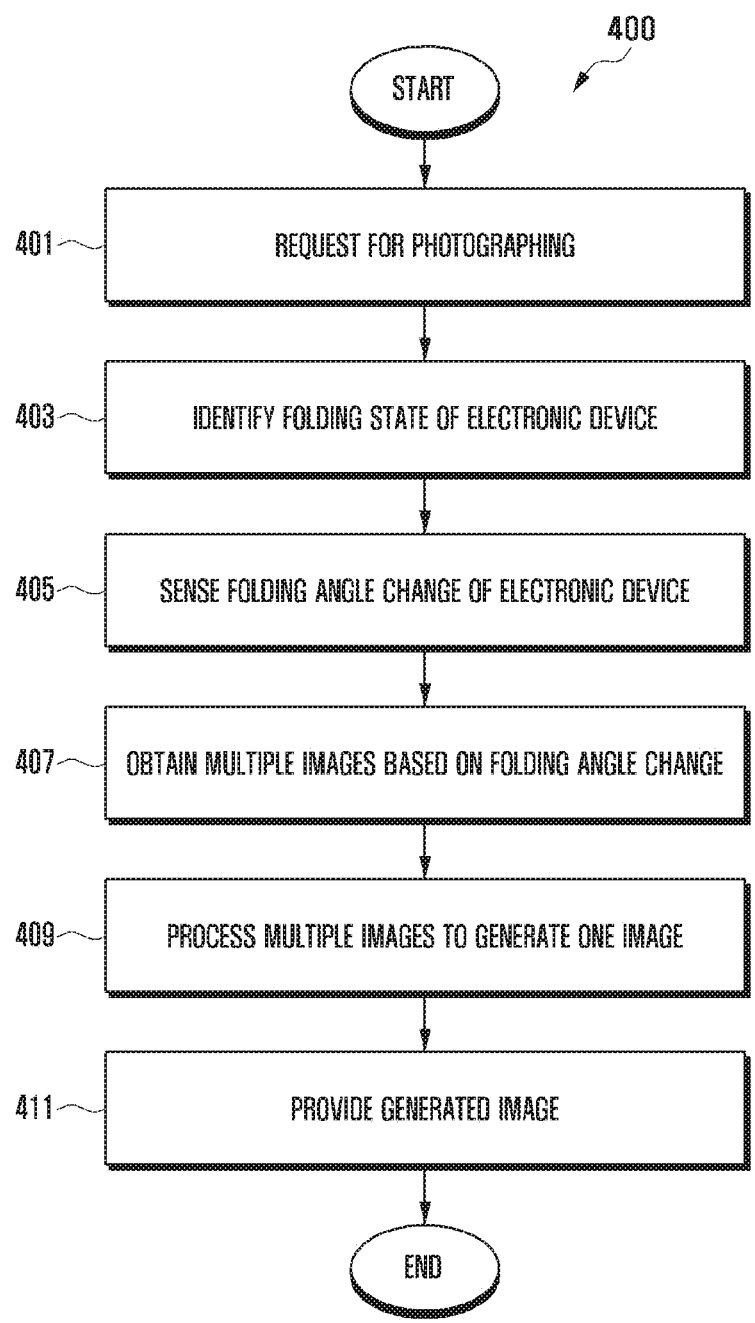
FIG. 4 illustrates an operation method of a foldable electronic device according to an embodiment.

FIG. 4 is a flowchart 400 illustrating an operation method of a foldable electronic device according to an embodiment.

Referring to FIG. 4, in step 401, a processor of the foldable electronic device may receive a photographing request. Through a first display or a second display, the processor 120 may display a preview image obtained from at least one of multiple cameras as a camera application is executed. For example, the processor 120 may display a preview image through the first display 230 when the electronic device 101 is unfolded, and may display a preview image through the second display 240 when the electronic device 101 is folded. The processor 120 may provide a photographing button on the displayed preview image, and may detect an input through which a user selects the photographing button. The photographing request may be that the photographing button is selected (or touched) by the user.

The processor 120 may receive a selection of the photographing button from the user after a photographing mode is configured to be a "panorama" mode by the user. The photographing mode is associated with camera photographing, and may include at least one among, for example, a normal mode (or auto mode), a moving image mode, a selfie mode, a rear selfie mode, a live focus mode, a slow motion mode, a pro-mode, or a panorama mode. Hereinafter, a description will be made of an operation performed after pressing the photographing button when the photographing mode is configured to be a "panorama" mode.

In step 403, the processor 120 may identify a folding state of the electronic device 101. The folding state may be determined based on the distance (or the angle) between the first housing 210 and the second housing 220 of the electronic device 101. The processor 120 may determine whether the first surface 211 and the second surface 221 approach each other by using a sensor module, and may determine the folding state of the electronic device 101 based on the determination. The sensor module 176 may include at least one among a proximity sensor, an infrared (IR) sensor, a hall sensor, a motion sensor, an angle sensor, and an illumination sensor. The motion sensor may be a gyro sensor or an acceleration sensor, may sense direction information of the electronic device 101, and may transmit the sensed direction information to the processor 120.

When the electronic device 101 is folded, the motion sensor may sense a direction of the first surface 211 and a direction of the second surface 221, and may transmit, to the processor 120, information regarding the sensed direction of the first surface 211 and the sensed direction of the second surface 221.

The angle sensor may be disposed in the hinge structure 260 so as to directly sense the angle between the first housing 210 and the second housing 220. Alternatively, the angle sensor may be a gyro sensor or an acceleration sensor. The processor 120 may identify a folding state of the electronic device 101 in response to the photographing request and then may sense a change in the identified folding state, which may be one of an unfolded state or a folded state.

In step 405, the processor 120 may sense a folding angle change of the electronic device 101. For example, when the folding state is an unfolded state (e.g. 180 degrees) in step 403, the processor 120 may sense whether a folding angle is changed to less than 180 degrees. Alternatively, when the folding state is a folded state (e.g. 0 degrees) in step 403, the processor 120 may sense whether a folding angle is changed to greater than 0 degrees. For example, the processor 120 may calculate an angle formed by the first housing 210 and the second housing 220 based on sensing data received from the sensor module 176. The angle sensor included in the sensor module 176 may be disposed in the hinge structure 260 of the electronic device 101 so as to calculate an angle formed by the first housing 210 and the second housing 20, and may transmit a calculated angle value to the processor 120. Alternatively, the angle sensor may be a geomagnetic sensor, a gyro sensor, or an acceleration sensor embedded in each of the first housing 210 and/or the second housing 220. A sensor and a method for sensing the angle between the first housing 210 and the second housing 220 may be changed into various forms. The processor 120 may start to take a panoramic picture (or capture a panoramic image) when a folding angle change is sensed.

In step 407, the processor 120 may obtain multiple images based on the folding angle change. In order to obtain a panoramic image, it may be necessary to sequentially perform photographing while changing the photographing direction of the electronic device 101 with various angles. The panoramic image has an angle of view (e.g. greater than or equal to 90 degrees) wider than the angle of view (e.g. 50 degrees) of a normal image, and thus multiple images captured at various angles may be combined (or processed) with each other so as to be synthesized as one image. Therefore, the processor 120 may obtained an image whenever the folding angle of the electronic device 101 is changed. For example, the processor 120 may obtain an image whenever the folding angle of the electronic device 101 is changed to predetermined angles (e.g. 10 degrees, 30 degrees, etc.). If an angle in a folded state is 0 degrees and is changed to an angle in an unfolded state of 180 degrees, the processor 120 may obtain at least one image because images are obtained whenever the folding angle of the electronic device 101 is changed. The predetermined angles, at which images are obtained, may be configured as a default by the electronic device 101 or a user.

The processor 120 may obtain, based on the folding angle change, an image from the fifth camera 225 in the third surface 213 of the first housing 210. Based on the folding angle change, the processor 120 may simultaneously or sequentially obtain images from at least one among the second camera 215, the third camera 217, and the fourth camera 219, which are included in the fourth surface 223 of the second housing 220. For example, the processor 120 may obtain an image from the second camera 215 disposed in a horizontal direction identical to or similar to that of the fifth camera 225.

Alternatively, the processor 120 may obtain an image from at least one among the second camera 215, the third camera 217, and the fourth camera 219, having camera attributes (e.g. angle of view, resolution, aperture, ISO) identical to or similar to those of the fifth camera 225. Alternatively, the processor 120 may obtain an image from each of the second camera 215, the third camera 217, or the fourth camera 219. A camera, from which an image can be obtained, among three cameras included in the fourth surface 223 may be configured by a user selection or as a default in the electronic device 101. The processor 120 may obtain images from the fifth camera 225 and the second camera 215 based on the folding angle change.

The processor 120 may obtain, based on the folding angle change, an image from the first camera 214 disposed on the first surface 211 of the first housing 210. When the angle of view of a panoramic image is 360 degrees, the processor 120 may obtain an image from the first camera 214. The second camera 215 to the fifth camera 225 may be arranged on the rear surfaces of the electronic device 101, and the first camera 214 may be disposed on the front surface of the electronic device 101.

When a panoramic image is generated using images obtained from the first camera 214 to the fifth camera 225, the panoramic image may be generated to have a wider angle of view than when a panoramic image is generated using only images obtained from the second camera 215 to the fifth camera 225 arranged on the rear surfaces of the electronic device 101. Thus, the processor 120 may activate the first camera 214 according to a folding angle change of the electronic device 101 and may use an image obtained by the first camera 214 to generate a panoramic image. For example, when the folding angle is greater than or equal to 120 degrees, the processor 120 may activate the first camera 214 and may use an image obtained by the first camera 214 to generate a panoramic image. Generating a panoramic image by using an image obtained from the first camera 214 may differ depending on a user selection or configuration of the electronic device 101.

The processor 120 may provide, to a user, guidance such that the user can perform panoramic photographing while changing a folding angle of the electronic device 101. The guidance may include at least one among a voice, a text, an image, or a moving image. The processor 120 may output a guidance voice relating to the photographing via a speaker 155. Alternatively, the processor 120 may display a guidance message through the first display 230 or the second display 240. The guidance message may include at least one among a text, an image, or a moving image.

In step 409, the processor 120 may process the multiple images to generate one image. The processor 120 may obtain an image until the folding angle change of the electronic device 101 is completed or/and until panoramic image generation is possible (or completed). For example, when photographing starts while the electronic device 101 is unfolded, the processor 120 may obtain an image until the electronic device 101 is folded. Alternatively, when photographing starts while the electronic device 101 is folded, the processor 120 may obtain an image until the electronic device 101 is unfolded. The processor 120 may also determine whether the folding angle has been changed to a predetermined folding angle (e.g. less than or equal to 30 degrees, or greater than or equal to 150 degrees).

Alternatively, the processor 120 may obtain images until an image necessary for generating a panoramic image is obtained. The image necessary for generating the panoramic image may be configured as a default in the electronic device 101. When a panoramic image can be generated using obtained multiple images, the processor 120 may stitch the obtained multiple images together to generate the panoramic image. When panoramic image generation is possible, even when the folding angle change of electronic device 101 is not completed, the processor 120 may stop image obtaining according to the folding angle and generate a panoramic image. The processor 120 may perform a hand-shake compensation for the obtained multiple images to generate a panoramic image.

Some regions may overlap each other when images are obtained according to a change of the angle (or folding angle) between the first housing 210 and the second housing 220. The processor 120 may remove (or delete) the overlapping regions of the images so as to generate a panoramic image. The processor 120 may determine a reference point based on the obtained multiple images, and may arrange the multiple images based on the reference point. Some of the arranged images may overlap each other. The processor 120 may remove the overlapping images so as to generate a panoramic image. A method for processing multiple images to generate a panoramic image is conventional, and thus a detailed description thereof will be omitted.

In step 411, the processor 120 may provide the generated image. The processor 120 may display the generated panoramic image through the first display 230 or the second display 240. The processor 120 may display the generated image through the first display 230 when the electronic device 101 has changed from a folded state to an unfolded state, and may display the generated image through the second display 240 when the electronic device 101 has changed from an unfolded state to a folded state. The processor 120 may store the displayed image in a memory.

The processor 120 may receive an editing request for editing the displayed image from the user, and may edit the displayed image based on user input. The user may edit the image by using an editing function provided in a camera application, or by executing a separate application (e.g. an image editing application). The processor 120 may store the edited image in the memory 130 in response to editing completion. The processor 120 may store both the image before editing and the edited image according to user configuration or configuration of the electronic device 101.

Figure 5A:
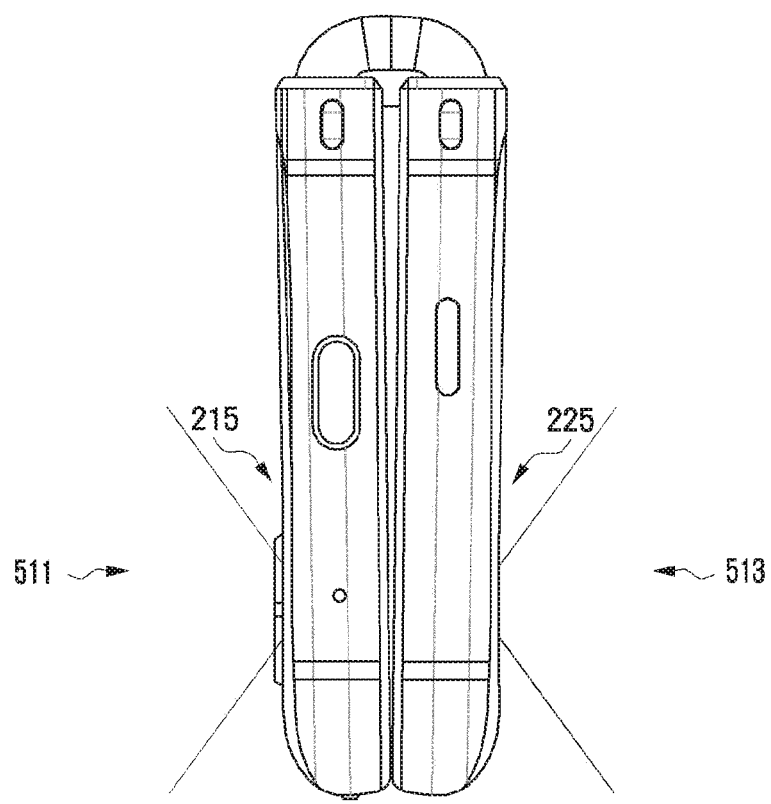
FIG. 5A illustrates an example of a first folding angle of a foldable electronic device according to an embodiment.

FIG. 5A illustrates an example of a first folding angle of a foldable electronic device according to an embodiment.

Referring to FIG. 5A, the first folding angle 510 may be an angle when an electronic device is in a folded state. The folded state may be when a first housing and a second housing are arranged to face each other. In the folded state, the angle between the first housing 210 and the second housing 220 is formed as a narrow angle (e.g. 0 to 5 degrees), and the first surface 211 of the first housing 210 may face the second surface 221 of the second housing 220. For example, the first folding angle 510 is an angle formed between the first surface 211 and the second surface 221 and may be 0 degrees to 5 degrees. Although the narrow angle in the folded state has been described as 0 degrees to 5 degrees, the narrow angle in the folded state may be 0 degrees. Alternatively, the narrow angle may be an angle (e.g. 3 degrees) less than 5 degrees. The disclosure is not limited thereto, however.

In the first folding angle 510, at least one among the second camera 215, the third camera 217, and the fourth camera 219 arranged on the fourth surface 223 of the second housing 220 may perform photographing at a first angle of view 511. A panoramic image may be captured by at least one among the second camera 215, the third camera 217, and the fourth camera 219. Hereinafter, a description will be made of using the second camera 215, but the disclosure is not limited thereto.

In the first folding angle 510, the fifth camera 225 disposed on the third surface 213 of the first housing 210 may perform photographing at a second angle of view 513. The first angle of view 511 may be equal to or different from the second angle of view 513. When the first angle of view 511 is different from the second angle of view 513, the processor 120 may identically configure the angles of view before photographing is performed. Alternatively, the processor 120 may identically configure a camera attribute of the second camera 215 and a camera attribute of the fifth camera 225. In the first folding angle 510 or when a change from the first folding angle 510 to a second folding 520 is sensed, the processor 120 may obtain a first image captured at the first angle of view 511 from the second camera 215 and a second image captured at the second angle of view 513 from the fifth camera 225.

Figure 5B:
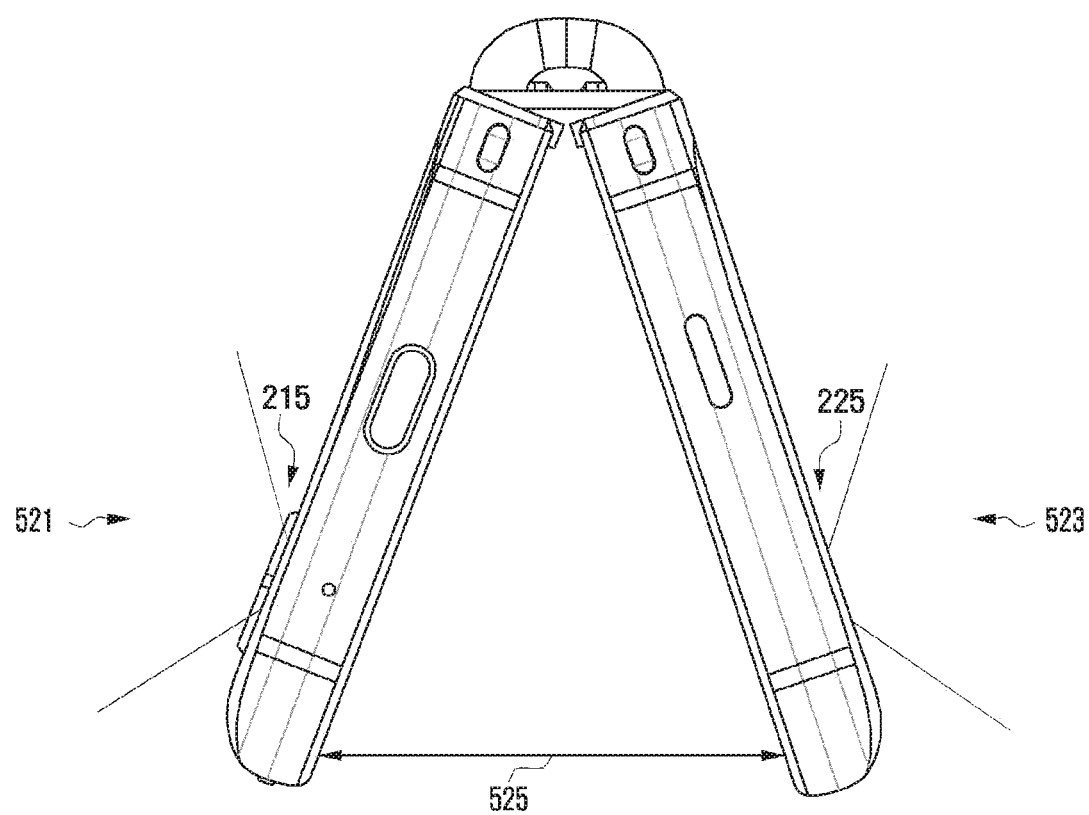
FIG. 5B illustrates an example of a second folding angle of a foldable electronic device according to an embodiment.

FIG. 5B illustrates an example of a second folding angle of a foldable electronic device according to an embodiment.

Referring to FIG. 5B, the second folding angle 520 may be a first angle 525 when an electronic device is in an intermediate state. The intermediate state is when the first housing 210 and the second housing 220 are arranged with a predetermined angle therebetween, and the electronic device 101 may not be in the unfolded state or the folded state. The intermediate state may be when the first surface 211 of the first housing 210 and the second surface 221 of the second housing 220 form a predetermined angle (e.g. 6 degrees to 179 degrees) therebetween. For example, the second folding angle 520 may be 30 or 50 degrees 525. The description of the folding angle is merely made to assist in understanding the disclosure, and does not limit the disclosure. In the second folding angle 520, the second camera 215 may perform photographing at a third angle of view 521, and the fifth camera 225 may perform photographing at a fourth angle of view 523. In the second folding angle 520 or when a change from the second folding angle 520 to a third folding angle 530 is sensed, the processor 120 may obtain a third image captured at the third angle of view 521 from the second camera 215 and a fourth image captured at the fourth angle of view 523 from the fifth camera 225.

Figure 5C:
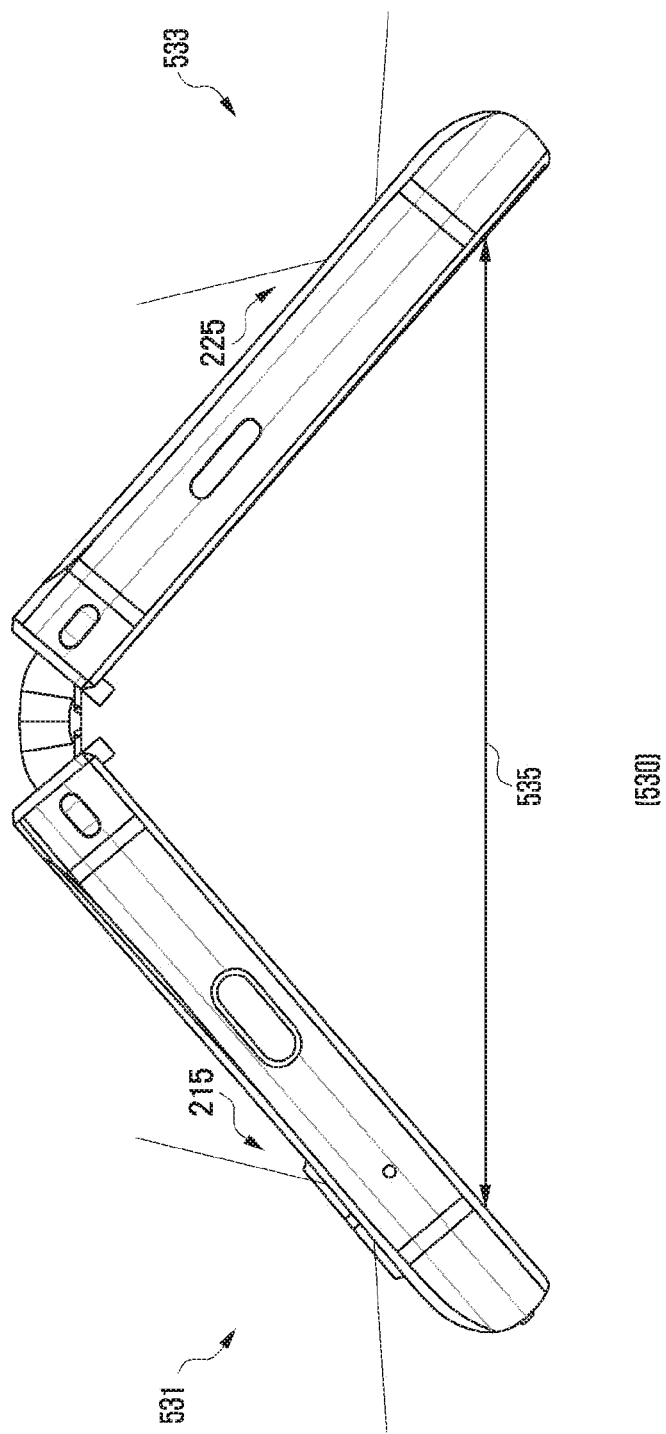
FIG. 5C illustrates an example of a third folding angle of a foldable electronic device according to an embodiment.

FIG. 5C illustrates an example of a third folding angle of a foldable electronic device according to an embodiment.

Referring to FIG. 5C, the third folding angle 530 may be a second angle 535 when an electronic device is in an intermediate state. For example, the third folding angle 530 may be 60, 90 or 120 degrees 535. In the third folding angle 530, the second camera 215 may perform photographing at a fifth angle of view 531, and the fifth camera 225 may perform photographing at a sixth angle of view 533. In the third folding angle 530 or when a change from the third folding angle 530 to a fourth folding angle 540 is sensed, the processor 120 may obtain a fifth image captured at the fifth angle of view 531 from the second camera 215 and a sixth image captured at the sixth angle of view 533 from the fifth camera 225.

Figure 5D:
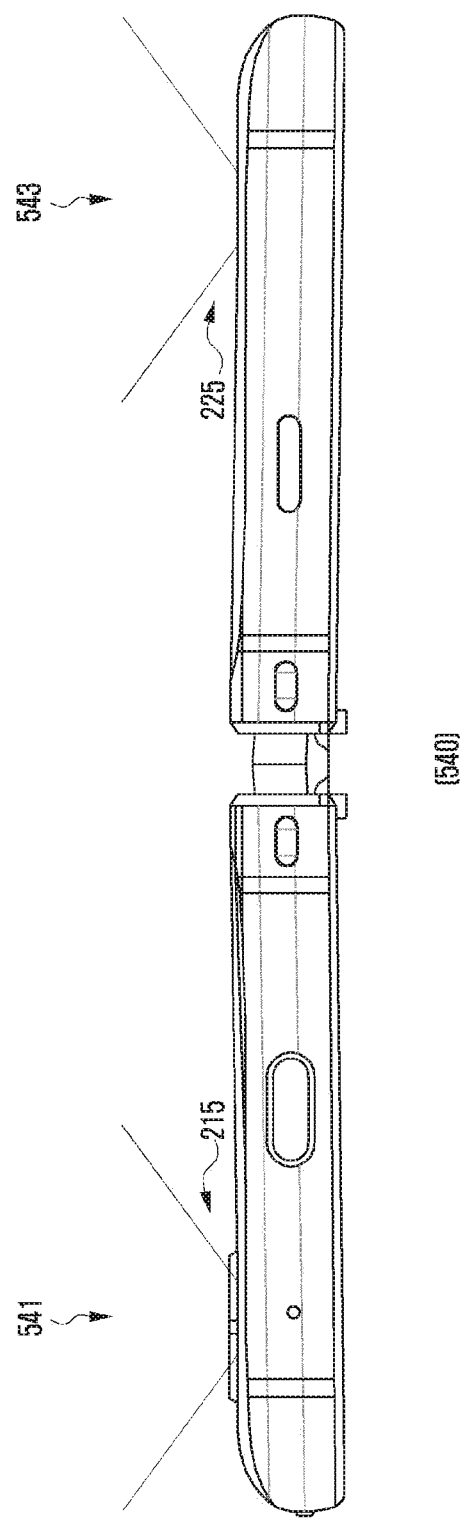
FIG. 5D illustrates an example of a fourth folding angle of a foldable electronic device according to an embodiment.

FIG. 5D illustrates an example of a fourth folding angle of a foldable electronic device according to an embodiment.

Referring to FIG. 5D, the fourth folding angle 540 may be an angle when an electronic device is in an unfolded state. For example, the fourth folding angle 540 may be 180 degrees 545. In the fourth folding angle 540, the second camera 215 may perform photographing at a seventh angle of view 541 and the fifth camera 225 may perform photographing at an eighth angle of view 543. In the fourth folding angle 540, the processor 120 may obtain a seventh image captured at the seventh angle of view 541 from the second camera 215 and an eighth image captured at the eighth angle of view 543 from the fifth camera 225.

Figure 6A:
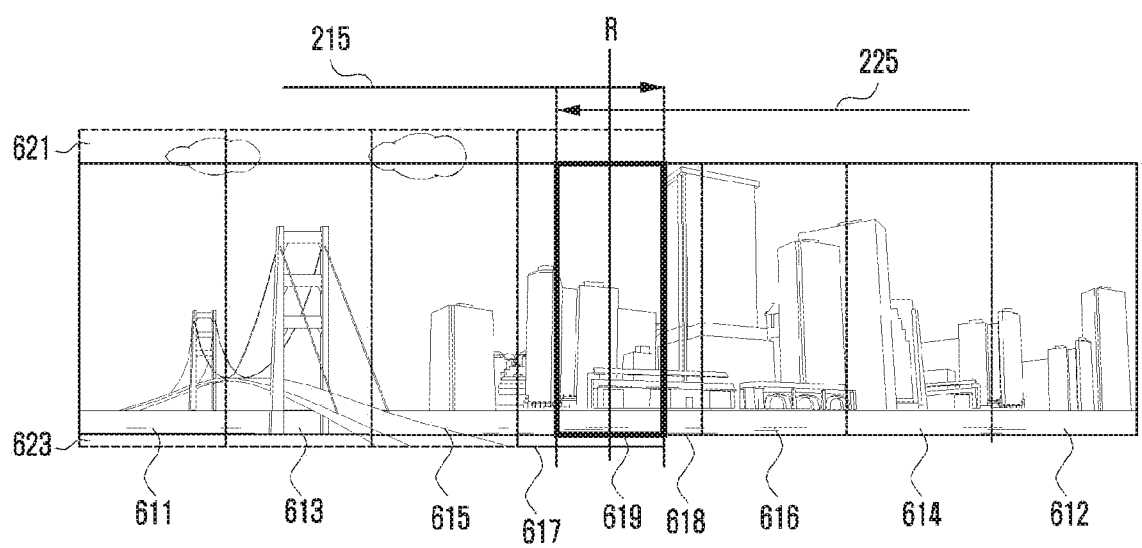
FIG. 6A illustrates an example of generating a panorama image in a foldable electronic device when the electronic device changes from a folded state to an unfolded state, according to an embodiment.
Figure 6A:
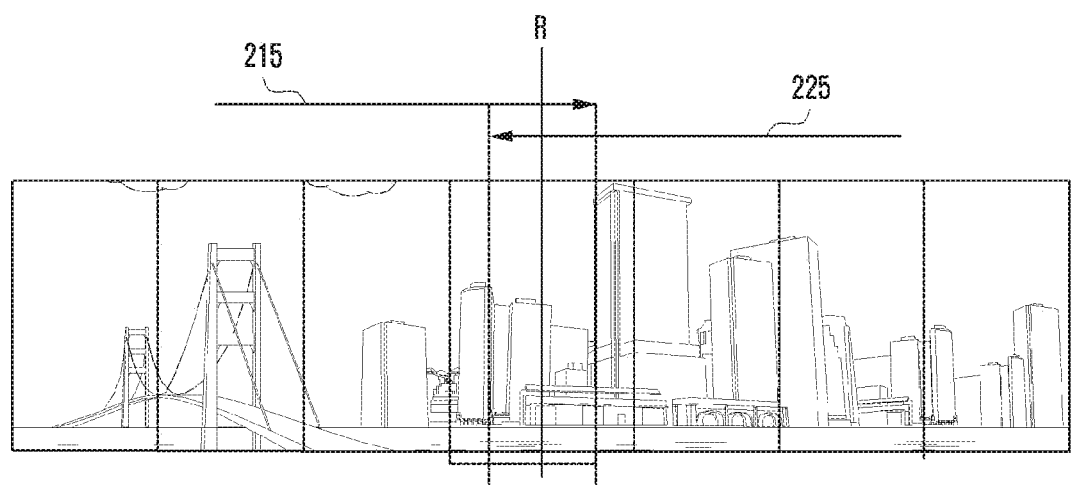

FIG. 6A illustrates an example of generating a panoramic image by using images obtained when an electronic device changes from a folded state to an unfolded state according to an embodiment.

Referring to FIG. 6A, a processor of a foldable electronic device may generate a panoramic image 620 by using images 611 to 618 obtained as the electronic device 101 changes from a folded state to an unfolded state. For example, the processor 120 may obtain a first image 611 and a second image 612 in a first folding angle 510. For example, the first image 611 is captured by the second camera 215 at the first angle of view 511 in the first folding angle 510, and the second image 612 is captured by the fifth camera. 225 at the second angle of view 513 in the first folding angle 510. The processor 120 may obtain a third image 613 and a fourth image 614 in a second folding angle 520. For example, the third image 613 is captured by the second camera. 215 at the third angle of view 521 in the second folding angle 520, and the fourth image 614 is captured by the fifth camera 225 at the fourth angle of view 523 in the second folding angle 520.

The processor 120 may obtain a fifth image 615 and a sixth image 616 in a third folding angle 530. For example, the fifth image 615 is captured by the second camera 215 at the fifth angle of view 531 in the third folding angle 530, and the sixth image 616 is captured by the fifth camera 225 at the sixth angle of view 533 in the third folding angle 530. The 120 may obtain a seventh image 617 and an eighth image 618 in a fourth folding angle 540. For example, the seventh image 617 is captured by the second camera 215 at the seventh angle of view 541 in the fourth folding angle 540, and the eighth image 618 is captured by the fifth camera 225 at the eighth angle of view 543 in the fourth folding angle 540.

The seventh image 617 and the eighth image 618, which have been captured in the fourth folding angle 540, may have a partial region 619 (or a partial image) in which the seventh image 617 and the eighth image 618 overlap each other because two camera angles of view are similar or equal to each other. The processor 120 may generate the panoramic image 620 by using the first image 611 to the eighth image 618. The processor 120 may determine a reference point "R" based on the obtained multiple images and may arrange the multiple images based on the reference point R so as to generate the panoramic image 620 by a stitching technique. The processor 120 may delete the partial region 619 from the seventh image 617 and eighth image 618 overlapping each other so as to generate the panoramic image 620. For example, the processor 120 may maintain the seventh image 617 and delete the partial region 619 having reference point R from the eighth image 618, thereby generating the panoramic image 620.

Due to the difference between the angles of view of the second camera 215 and the fifth camera 225, the processor 120 may generate the panoramic image 620 by removing (or deleting) some regions 621 and 623 from images 610 captured to be large (or wide). For example, the first image 611, the third image 613, the fifth image 615, and the seventh image 617 obtained from the second camera 215 may have longitudinal partial regions by which the images obtained from the second camera 215 are larger than the second image 612, the fourth image 614, the sixth image 616, and the eighth image 618 obtained from the fifth camera 225. Among the obtained images 610, the processor 120 may remove longitudinal partial regions 621 and 623 of images obtained from a camera having a wide angle of view such that the images obtained from the camera having a wide angle of view match an image obtained from a camera having a narrow angle of view.

Figure 6B:
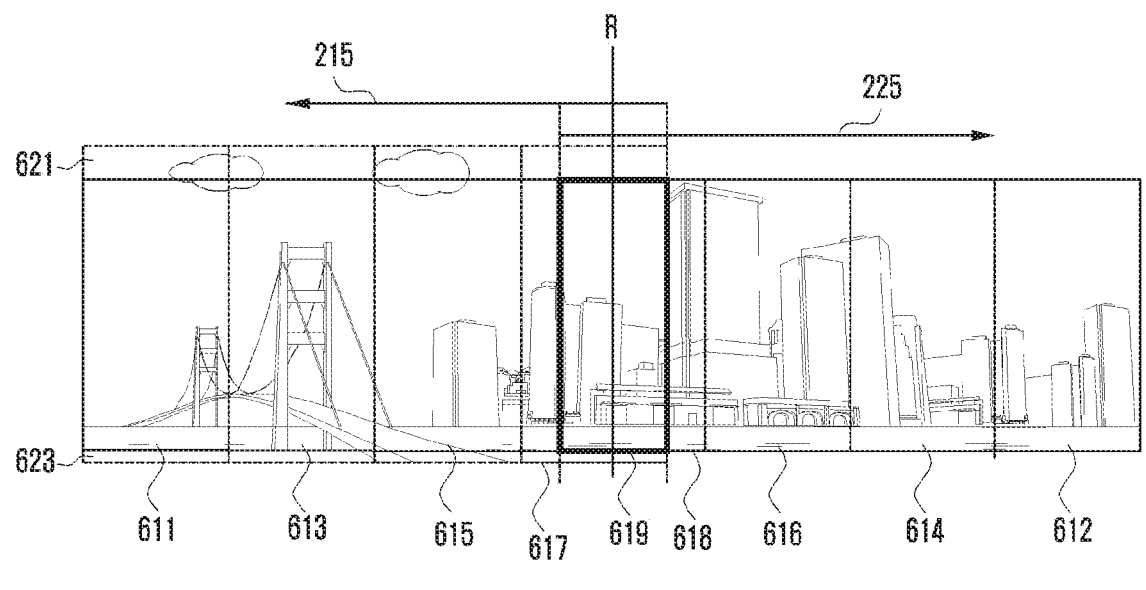
FIG. 6B illustrates an example of generating a panorama image in a foldable electronic device when the electronic device changes from an unfolded state to a folded state, according to a second embodiment.

FIG. 6B illustrates an example of generating a panoramic image by using images obtained when an electronic device changes from an unfolded state to a folded state according to an embodiment.

Referring to FIG. 6B, the processor 120 of the foldable electronic device 101 may generate a panoramic image 620 by using images 611 to 618 obtained when the electronic device 101 changes from an unfolded state to a folded state.

FIG. 6B is similar in configuration to FIG. 6A, differing only in a folding angle change depending on time, and thus a detailed description thereof will be omitted. For example, the processor 120 may obtain multiple images when the folding angle changes to the fourth folding angle 540, the third folding angle 530, the second folding angle 520, and the first folding angle 510 in sequence. The processor 120 may obtain a seventh image 617 and an eighth image 618 in the fourth folding angle 540, may obtain a fifth image 615 and a sixth image 616 in the third folding angle 530, may obtain a third image 613 and a fourth image 614 in the second folding angle 520, and may obtain a first image 611 and a second image 612 in the first folding angle 510. The processor 120 may generate the panoramic image 620 by using the first image 611 to the eighth image 618. FIGS. 6A and 6B may have the same generated panoramic images 620, differing only in the folding angle change.

Figure 7:
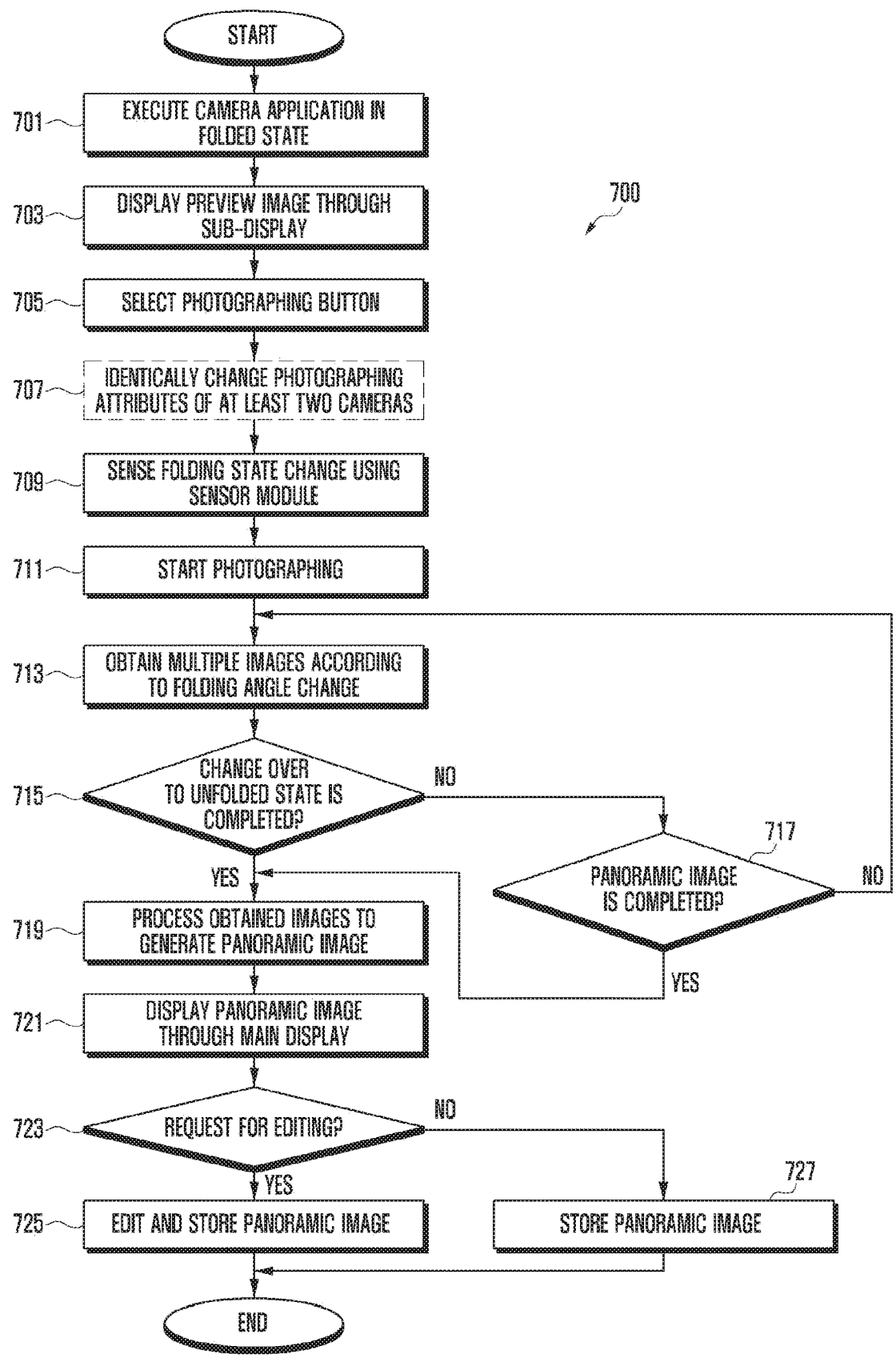
FIG. 7 illustrates a method for taking a panoramic picture in a foldable electronic device according to an embodiment.

FIG. 7 is a flowchart 700 illustrating a method for taking a panoramic picture in a foldable electronic device according to an embodiment.

Referring to FIG. 7, in step 701, a processor may execute a camera application in a folded state. The processor may receive a request for execution of the camera application from a user through a second display. For example, the processor may execute the camera application when the camera application included in a latest execution list is selected by the user or when an icon corresponding to the camera application included in a home screen is selected by the user.

In step 703, the processor may display a preview image through a sub-display. In a folded state, only the second display may be turned on and a first display may be turned off. The processor may display an execution screen for the camera application on the second display. The execution screen for the camera application may include photographing-related information and a preview image obtained from at least one among cameras mounted on the rear of the electronic device. The photographing-related information may include at least one among photographing configuration information (e.g. a picture size, timer, and flash on/off), photographing-mode information, or photographing-control information (e.g. a photographing button, a latest picture viewing button).

In step 705, the processor may receive a selection of a photographing button. The processor may detect user input of pressing (touching) a photographing button displayed on the second display. Alternatively, the processor may detect user input of pressing a hardware button (e.g. a sound button, a voice call button) preconfigured in the electronic device in relation to the photographing button. When the user input as described above is detected, the processor may recognize that a photographing request has been made (or received). The processor may receive a selection of the photographing button from the user after a photographing mode is configured as a panorama mode by the user. The photographing mode is associated with camera photographing, and may include at least one of a normal (or auto) mode, a moving image mode, a selfie mode, a rear selfie mode, a live focus mode, a slow motion mode, a pro-mode, or a panorama mode. Hereinafter, a description will be made of an operation performed after an operation of pressing the photographing button when the photographing mode is configured to be a panorama mode.

In step 707, the processor may identically change (or configure) photographing attributes of at least two cameras. During panoramic image capturing, the processor may obtain images by using at least two cameras mounted on the rear surfaces of the electronic device. Since at least two cameras are used for panoramic image generation, the processor may use, for panoramic image generation, the second camera which is disposed in the horizon direction identical or similar to that of the fifth camera. Alternatively, the processor may use, for panoramic image generation, a camera having camera attributes identical or similar to those of the fifth camera.

Alternatively, the processor may also obtain an image from each of the second, third, and fourth cameras. A camera, from which an image can be obtained, among three cameras included in the fourth surface may be configured by a user selection or may be configured as a default in the electronic device. The processor may obtain, based on the folding angle change, images from the fifth camera and the second camera.

The second camera and the fifth camera may have the same or different camera attributes. The processor may perform photographing after identically changing photographing attributes of the second camera and the fifth camera. In the case of the different camera attributes, it may be difficult to correct an image during panoramic image generation. However, even in this case, there is no difficulty in generating a panoramic image. Therefore, step 707 can be omitted.

The processor may apply different image generation (or correction) algorithms based on whether step 707 is performed. When step 707 is performed, the processor may use a first correction algorithm to generate a panoramic image. When step 707 is not performed, the processor may use a second correction algorithm different from the first correction algorithm to generate a panoramic image.

In step 709, the processor may sense a folding state change by using a sensor module. The folding state change may be a change from a folded state to an intermediate state. The processor may determine, using a sensor module whether the first surface and the second surface approach each other, and may sense identify), based on the determination, whether a folding state of the electronic device has changed. The sensor module may include at least one among a proximity sensor, an infrared (IR) sensor, a hall sensor, a motion sensor, an angle sensor, or an illumination sensor. The motion sensor may be a gyro sensor or an acceleration sensor, may sense direction information of the electronic device, and may transmit the sensed direction information to the processor. The angle sensor may be disposed in the hinge structure so as to directly sense the angle between the first housing and the second housing. Alternatively, the angle sensor may be a gyro sensor or an acceleration sensor.

In step 711, the processor may start to perform photographing in response to the folding state change, After a photographing request is received from the user, the processor may start to perform photographing when the folding state change of the electronic device is sensed. For example, when the folding state change is not sensed, the processor does not start to perform photographing and may wait until the folding state change is sensed. For example, the processor may display a preview image on the second display until the folding state change is sensed. The folding state change is different from sensing the movement of the electronic device, and may be a folding angle change of the electronic device. When the folding state change is not sensed for a predetermined time (e.g. five or ten seconds) after the photographing request made by the user, the processor may return to step 703 or may end step 711. Alternatively, when the folding state change is not sensed, the processor may wait until the folding state change is sensed. This may change depending on a user configuration or a configuration of the electronic device.

In step 713, the processor may obtain multiple images according to a folding angle change. The processor may obtain an image whenever the folding angle of the electronic device changes to a predetermined angle. If an angle in a folded state is 0 degrees and an angle in an unfolded state is 180 degrees, the processor obtains an image whenever the folding angle of the electronic device changes to any angle in between these degree angles, and thus may obtain at least one image. The predetermined angle, at which an image is obtained, may be configured by a user or as a default in the electronic device. The processor may obtain, based on the folding angle change, an image from each of the fifth camera and the second camera.

The processor may obtain, based on the folding angle change, an image from the first camera disposed on the first surface of the first housing. When the angle of view of a panoramic image is 360 degrees, the processor may obtain an image from the first camera. The second camera to the fifth camera are arranged on the rear surfaces of the electronic device. However, the first camera may be disposed on a front surface of the electronic device.

When a panoramic image is generated using images obtained from the first camera to fifth camera, the panoramic image may be generated to have a wider angle of view than when a panoramic image is generated using only images obtained from cameras arranged on the rear surfaces of the electronic device. Thus, the processor may activate the first camera according to a folding angle change of the electronic device and may use an image obtained by the first camera to generate a panoramic image. For example, when the folding angle is greater than or equal to 120 degrees, the processor may activate the first camera and may use an image obtained by the first camera to generate a panoramic image. Generating a panoramic image by using an image obtained from the first camera may differ depending on a user selection or a configuration of the electronic device.

The processor may provide guidance that a user can use to perform panoramic photographing while changing a folding angle. The guidance may include at least one among a voice, a text, an image, or a moving image. The processor may provide the guidance by the initial predetermined number of times (e.g. ten times) a panoramic image is captured. The processor may output a guidance voice relating to the photographing via a speaker. Alternatively, the processor may display a guidance message through the second display for a predetermined time (e.g. three seconds). The guidance message may include at least one among a text, an image, or a moving image. The processor may display and then remove the guidance message based on the folding angle. For example, the processor may display a guidance message in a folded state and may remove the guidance message when the folding angle exceeds 60 degrees. The guidance message may be displayed on a partial region of the second display so as not to disturb panoramic image photographing.

In step 715, the processor may determine whether a changeover to an unfolded state is completed. Since photographing has started in the folded state, the processor may determine whether the electronic device has changed to an unfolded state. Alternatively, the processor may also determine whether the folding angle has changed to a predetermined folding angle, such as greater than or equal to 150 degrees. The processor may identify completion of the changeover to the unfolded state or completion of the changeover to the predetermined folding angle according to a user selection or a configuration of the electronic device. The processor may perform step 719 when the changeover to the unfolded state is completed, and may perform step 717 when the changeover to the unfolded state is not completed.

When the changeover to the unfolded state is not completed, in step 717, the processor may determine whether a panoramic image is completed. The processor may determine whether images necessary to generate a panoramic image have been obtained. The images necessary to generate the panoramic image may be configured as a default in the electronic device. The processor may perform step 719 when a panoramic image can be generated using the obtained multiple images, but may return to step 713 when a panoramic image cannot be generated using the obtained multiple images. When the changeover to the unfolded state is not completed and a panoramic image cannot be generated using the obtained multiple images, the processor may return to step 713 so as to obtain multiple images according to a folding angle change.

When the changeover to the unfolded state is completed or when a panoramic image can be generated, in step 719, the processor may process the obtained images so as to generate a panoramic image. When a panoramic image can be generated, the processor may stop image obtaining according to a folding angle and generate the panoramic image even when the folding angle change of the electronic device is not completed.

In images obtained according to a change of the angle (or folding angle) between the first housing and the second housing, some regions may overlap each other. The processor may remove (or delete) the some overlapping regions of the images so as to generate a panoramic image. The processor may determine a reference point based on the obtained multiple images, and may arrange the multiple images based on the reference point. Some of the arranged images may overlap each other. The processor may remove the overlapping images so as to generate a panoramic image. A method for processing multiple images to generate a panoramic image is conventional, and thus a detailed description thereof may be omitted.

In step 721, the processor may display the panoramic image through a main display. The processor may display the generated panoramic image through the first display in an unfolded state. The user may identify the displayed panoramic image and then determine whether to edit the panoramic image. The processor may provide information related to image editing (e.g. an editing button).

In step 723, the processor may determine whether an editing request is made. The processor may detect whether an editing button is selected by the user. The processor may perform step 725 when the editing request is made, and may perform step 727 when the editing request is not made.

When the editing request is made, in step 725, the processor may edit and store the panoramic image. The processor may edit the displayed image based on user input. The user may edit the image by using an editing function provided in a camera application, or may edit the image by executing a separate application (e.g. an image editing application). The user may perform editing, such as deleting or blurring a partial region of the panoramic image or inserting a sticker (or an emoticon) thereinto. The processor may store the edited panoramic image in a memory in response to editing completion. The processor may store both the image before editing and the edited image according to user configuration or configuration of the electronic device.

When the editing request is not made, the processor may store the displayed panoramic image in the memory in step 727.

Figure 8A:
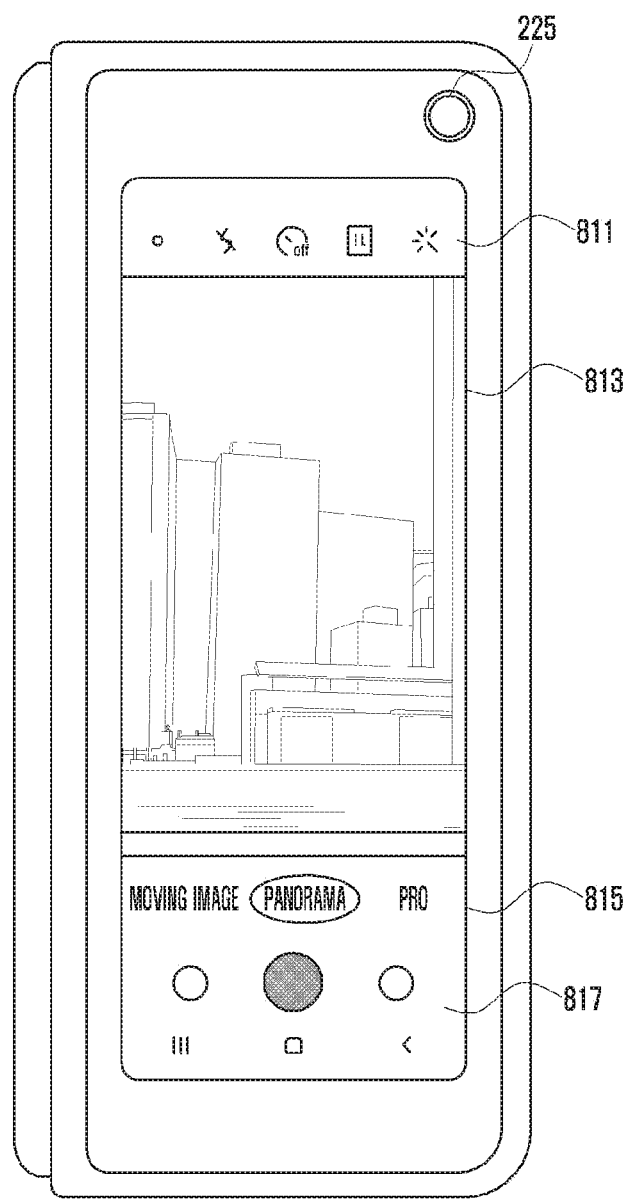
FIG. 8A illustrates an example of a first user interface according to a first folding angle in a foldable electronic device according to an embodiment.

FIG. 8A illustrates an example of a first user interface according to a first folding angle in a foldable electronic device according to an embodiment. Referring to FIG. 8A, a processor may display the first user interface 810 through a second display 240 in the first folding angle. The first user interface 810 may include a preview image 813 obtained from one among multiple cameras included in the electronic device. The first user interface 810 may further include configuration information 811, photographing-mode information 815, and photographing-control information 817.

For example, the configuration information 811 may include at least one among various types of information related to a configuration of the fifth camera 225 (e.g. a picture size, a moving image size, a timer, etc.), flash on/off, a screen viewing configuration, or camera switching (e.g. front/rear camera switching). The photographing-mode information 815 relates to a photographing mode, and may include at least one of a normal (auto) mode, a moving image mode, a selfie mode, a rear selfie mode, a live focus mode, a slow motion mode, a pro mode, and a panorama mode. The photographing-control information 817 may include at least one among a photographing button, a latest picture viewing button, and a previous picture viewing button. The first user interface 810 may be displayed when photographing is performed by the second camera 215 disposed on the fourth surface 223 of the first housing 210 when the electronic device is folded.

While the first user interface 810 is displayed when the electronic device is folded, the processor may configure the photographing-mode information 815 as a panorama mode and then detect user input for selecting a photographing button. The processor may provide a second user interface 820 as illustrated in FIG. 8B in the first folding angle 510 or when a change from the first folding angle 510 to the second folding angle 520 (or the third folding angle 530) is sensed.

Figure 8B:
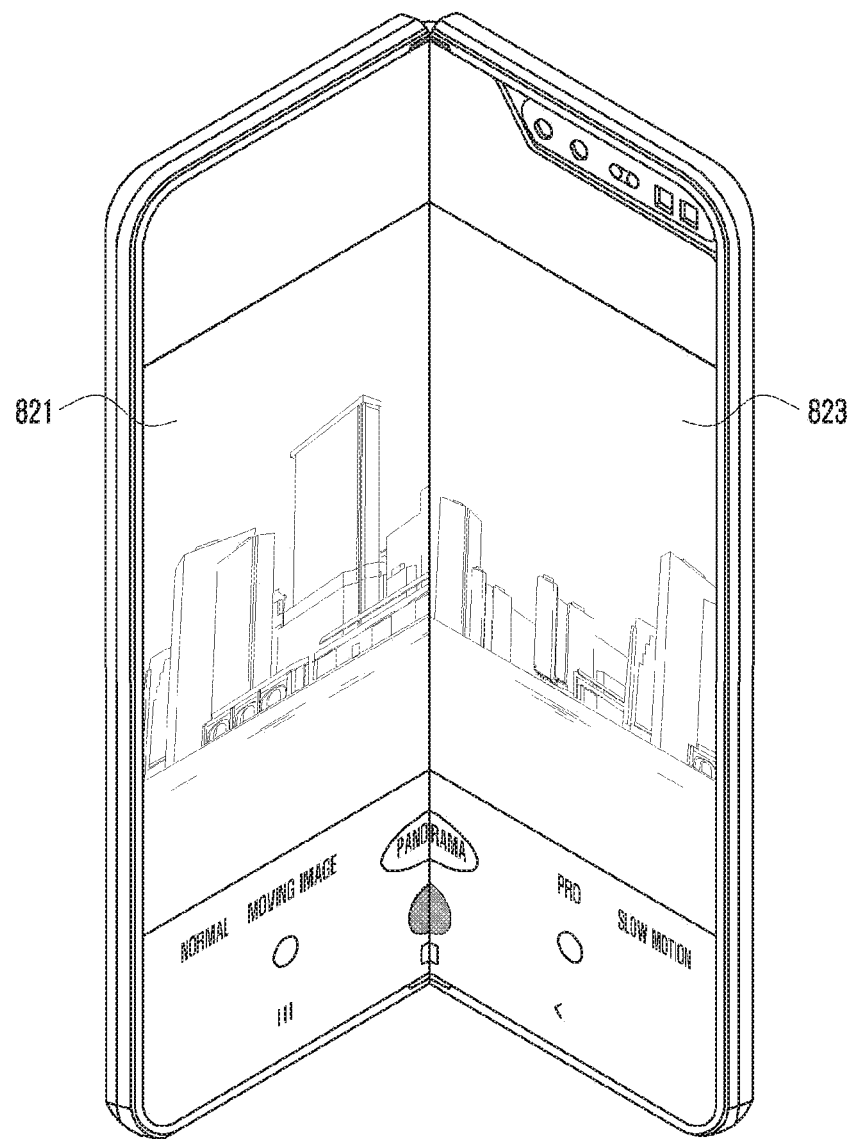
FIG. 8B illustrates an example of a second user interface of a second folding angle in a foldable electronic device according to an embodiment.

FIG. 8B illustrates an example of a second user interface of a second folding angle in a foldable electronic device according to an embodiment.

Referring to FIG. 8B, the processor may display the second user interface 820 through a first display in the second folding angle. The second user interface 820 may include a first image 821 obtained from the second camera 215 and a second image 823 obtained from the fifth camera 225. Further, the second user interface 820 may further include configuration information 811, photographing-mode information 815, and photographing-control information 817. In the second folding angle 520, the second camera 215 may perform photographing at a third angle of view 521, and the fifth camera 225 may perform photographing at a fourth angle of view 523. In the second folding angle 520 or when a change from the second folding angle 520 to a third folding angle 530 is sensed, the processor may obtain the first image 821 captured at the third angle of view 521 from the second camera 215 and the second image 823 captured at the fourth angle of view 523 from the fifth camera 225.

In FIG. 8B, it is described that the second user interface 820 includes images obtained in the second folding angle. However, the second user interface 820 may include images obtained in the third folding angle.

Figure 8C:
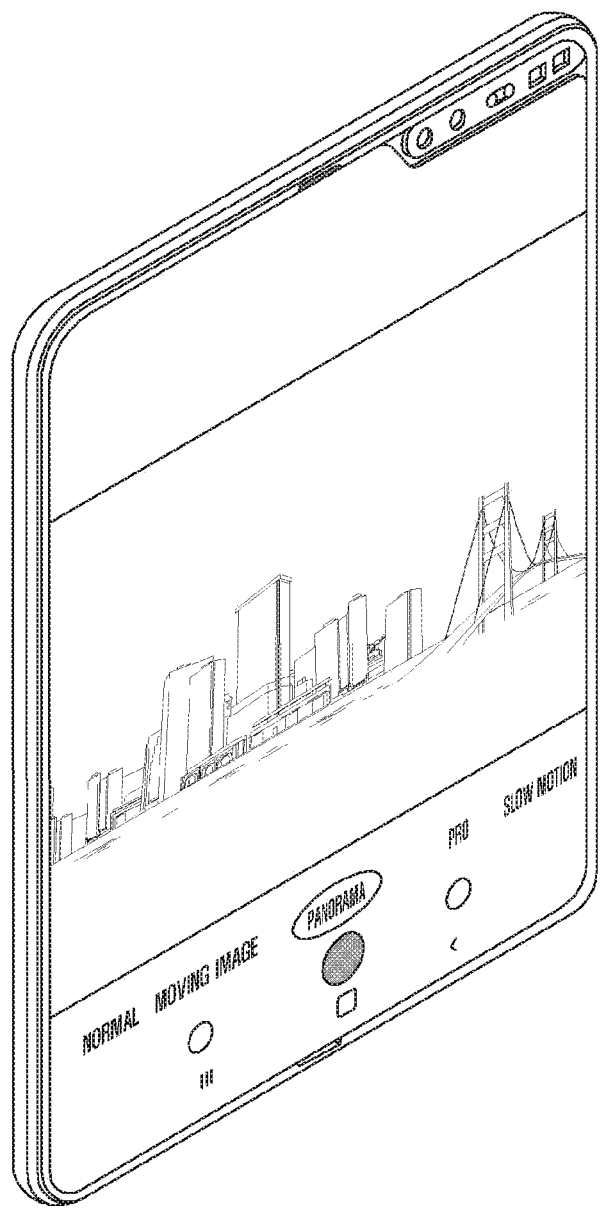
FIG. 8C illustrates an example of a third user interface according to a fourth folding angle in a foldable electronic device according to an embodiment.

FIG. 8C illustrates an example of a third user interface according to a fourth folding angle in a foldable electronic device according to an embodiment.

Referring to FIG. 8C, the processor may display the third user interface 830 through the first display 230 in the fourth folding angle 540. The third user interface 830 may include a panoramic image which is generated using multiple first images obtained from the second camera 215 and multiple second images obtained from the fifth camera 225, In the fourth folding angle 540, the second camera 215 may perform photographing at the seventh angle of view 541, and the fifth camera 225 may perform photographing at the eighth angle of view 543. The processor 120 may generate a panoramic image using images from the second camera 215 and the fifth camera 225.

Figure 9:
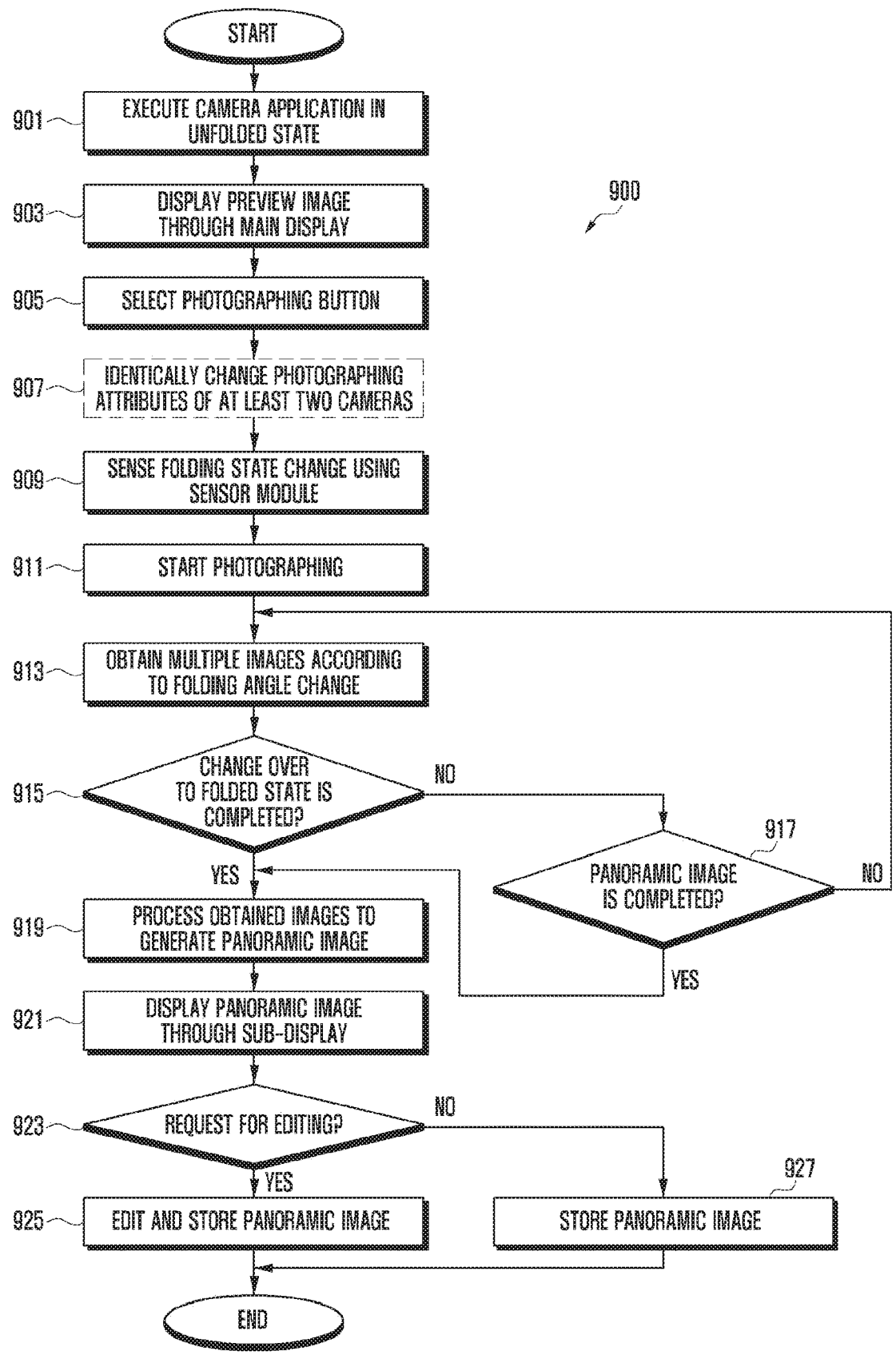
FIG. 9 illustrates a panoramic photographing method in a foldable electronic device according to an embodiment.

FIG. 9 is a flowchart 900 illustrating a panoramic photographing method in a foldable electronic device according to an embodiment.

In FIG. 9, steps identical to or similar to those of FIG. 7, differing only in a folding state, may be performed. Hereinafter, a description will be briefly made of steps overlapping those of FIG. 7.

Referring to FIG. 9, in step 901, a processor may execute a camera application in an unfolded state. The processor may receive a request for execution of the camera application from a user through a first display.

In step 903, the processor may display a preview image through a main display. In the unfolded state, only the first display may be turned on and a second display may be turned off. The processor may display an execution screen for the camera application on the first display. The execution screen for the camera application may include photographing-related information and a preview image obtained from at least one among multiple cameras mounted on the rear surfaces of the electronic device or the front surfaces of the electronic device.

In step 905, the processor may receive a selection of a photographing button. The processor may detect user input of pressing (touching) a photographing button displayed on the first display. Alternatively, the processor may detect user input of pressing a hardware button (e.g. a sound button, a voice call button) preconfigured in the electronic device in relation to the photographing button. When the user input as described above is detected, the processor may recognize that a photographing request has been made (or received). The processor may receive a selection of the photographing button from the user after a photographing mode is configured as a panorama mode by the user.

In step 907, the processor may identically change (or configure) photographing attributes of at least two cameras. During panoramic image capturing, the processor may obtain images by using at least two cameras mounted on the rear surfaces of the electronic device. The processor may turn on/off a camera activated (or operated) in step 901 based on a user selection, or an angle of view of a panoramic image, which is configured in the electronic device 101. For example, when the first camera mounted on a front surface of the electronic device has been activated in step 901, in step 907, the processor may deactivate (turn of or stop) the first camera and activate at least two cameras mounted on the rear surfaces of the electronic device. Alternatively, when the first camera mounted on a front surface of the electronic device has been activated, the processor may activate at least two cameras mounted on the rear surfaces of the electronic device without deactivating the first camera in step 907.

In step 909, the processor may sense a folding state change by using a sensor module. The folding state change may be a change from an unfolded state to an intermediate state. The processor may determine, using a sensor module, whether the first surface and the second surface approach each other, and may sense (or identify), based on the determination, whether a folding state of the electronic device has changed.

In step 911, the processor may start to perform photographing in response to the folding state change. After a photographing request is received from the user, the processor may start to perform photographing when the folding state change of the electronic device is sensed. For example, when the folding state change is not sensed, the processor does not start to perform photographing and may wait until the folding state change is sensed. The processor may display a preview image on the first display until the folding state change is sensed.

In step 913, the processor may obtain multiple images according to a folding angle change. The processor may obtain an image whenever the folding angle of the electronic device changes to a predetermined angle. The processor may obtain, based on the folding angle change, an image from each of the fifth camera and the second camera.

In step 915, the processor may determine whether a changeover to a folded state is completed. Since photographing has started in the unfolded state, the processor may determine whether the electronic device has changed to a folded state. Alternatively, the processor may also determine whether the folding angle has changed to a predetermined folding angle. The processor may identify completion of the changeover to the folded state or completion of the changeover to the predetermined folding angle according to a user selection or a configuration of the electronic device. The processor may perform step 919 when the changeover to the folded state is completed, and may perform step 917 when the changeover to the folded state is not completed.

When the changeover to the folded state is not completed, in step 917, the processor may determine whether a panoramic image is completed. The processor may determine whether images necessary to generate a panoramic image have been obtained. The images necessary to generate the panoramic image may be configured as a default in the electronic device. The processor may perform step 919 when a panoramic image can be generated using the obtained multiple images, but may return to step 913 when a panoramic image cannot be generated using the obtained multiple images. When the changeover to the folded state is not completed and a panoramic image cannot be generated using the obtained multiple images, the processor may return to step 913 so as to obtain multiple images according to a folding angle change.

When the changeover to the folded state is completed or when a panoramic image can be generated, in step 919, the processor may process the obtained images so as to generate the panoramic image. When a panoramic image can be generated, the processor may stop image obtaining according to a folding angle and generate the panoramic image even when the folding angle change of the electronic device is not completed.

In step 921, the processor may display the panoramic image through a sub-display. The processor may display the generated panoramic image through the second display in an unfolded state. The user may identify the displayed panoramic image and then determine whether to edit the panoramic image. The processor may provide information related to image editing.

In step 923, the processor may determine whether an editing request is made by detecting whether an editing button is selected by the user. The processor 120 may perform step 925 when the editing request is made, and may perform step 927 when the editing request is not made.

When the editing request is made, in step 925, the processor may edit and store the panoramic image. The processor may edit the displayed image based on user input. The user may edit the image by using an editing function provided in a camera application, or may edit the image by executing a separate application (e.g. an image editing application). The processor may store the edited panoramic image in a memory in response to editing completion.

When the editing request is not made, the processor may store the displayed panoramic image in the memory in step 927.

According to various embodiments, an operation method of a foldable electronic device (e.g. the electronic device 101 in FIG. 1), including a first housing (e.g. the first housing 210 in FIGS. 2A and 2B) and a second housing (e.g. the second housing 220 in FIGS. 2A and 2B) foldable with the first housing, may include: identifying, in response to a photographing request, a folding state of the foldable electronic device based on sensing data obtained from a sensor module (e.g. the sensor module 176 in FIG. 1) of the foldable electronic device; sensing a folding angle change of the foldable electronic device based on the identified folding state; obtaining, based on the folding angle change, multiple images from each of at least one first camera module (e.g. the fifth camera 225 in FIGS. 2A and 2B) arranged on the first housing to face a first direction and at least one second camera module (e.g. the second camera 215, the third camera 217, or the fourth camera 219 in FIGS. 2A and 2B) arranged on the second housing to face the first direction; and processing and providing the obtained multiple images.

Obtaining the multiple images may include obtaining a first image from the at least one first camera module and a second image from the at least one second camera module when the foldable electronic device changes to a first folding angle; and obtaining a third image from the at least one first camera module and a fourth image from the at least one second camera module when the foldable electronic device changes to a second folding angle.

Providing the obtained multiple images may include generating a panoramic image by using at least one among the first image, the second image, the third image, or the fourth image.

Providing the obtained multiple images may include displaying the processed images on a first display (e.g. the first display 230 in FIGS. 2A and 2B) disposed on the first housing to face a second direction opposite to the first direction and the second housing to face the second direction, or on a second display (e.g. the second display 240 in FIGS. 2A and 2B) disposed on the first housing to face the first direction.

Displaying the processed images may include displaying the processed images through the first display when the foldable electronic device is unfolded, and displaying the processed images through the second display when the foldable electronic device is folded.

The method may further include controlling the at least one first camera module or the at least one second camera module such that panoramic image capturing starts in response to the folding angle change.

In the electronic device, the at least one second camera module may include at least one among a second camera module (e.g. the second camera 215 in FIGS. 2A and 2B), a third camera module (e.g. the third camera 217 in FIGS. 2A and 2B), or a fourth camera module (e.g. the fourth camera 219 in FIGS. 2A and 2B). Obtaining the multiple images may include selecting the second camera module from among the at least one second camera module based on the at least one first camera module, and obtaining multiple images from the at least one first camera module and the second camera module.

Obtaining the multiple images may include identically configuring a camera attribute of the at least one first camera module and a camera attribute of the at least one second camera module, and obtaining multiple images from the at least one first camera module and the at least one second camera module.

At least two cameras mounted on the rear surfaces of a foldable electronic device can be used to take a panoramic picture according to a folding state change of the foldable electronic device.

A camera structure of a foldable electronic device can be used to efficiently take a panoramic picture for a short time, thereby enhancing user convenience.

The embodiments disclosed in the specification and the drawings have been presented to easily explain technical contents of the disclosure and help comprehension of the disclosure, but do not limit the scope of the disclosure. The various embodiments are not intended to limit the scope of the disclosure. Therefore, it must be understood that the scope of the disclosure includes all modifications or changes based on the technical idea of the disclosure, in addition to the embodiments disclosed herein.

While the disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A foldable electronic device comprising:
    a first housing;
    a second housing;
    at least one first camera module disposed on the first housing to face a first direction, and performing photographing at a first angle of view;
    at least one second camera module disposed on the second housing to face the first direction, and performing photographing at a second angle of view;
    a first display disposed on the first housing to face a second direction opposite to the first direction and the second housing to face the second direction;
    a sensor module configured to sense a folding state of the foldable electronic device;
    a memory; and
    a processor configured to:
    identify, in response to a photographing request, the folding state of the foldable electronic device based on sensing data obtained from the sensor module;
    sense a folding angle change of the foldable electronic device based on the identified folding state;
    set the first angle of view and the second angle of view to be identical with each other before performing photographing;
    obtain, based on the folding angle change, multiple images from each of the at least one first camera module and the at least one second camera module; and
    generate and provide a panoramic image by removing an overlapping region from the obtained multiple images,
    wherein the processor is further configured to:
    determine whether the folding angle change of the foldable electronic device is completed or whether panoramic image generation is possible; and
    stop image obtaining according to the folding angle change of the foldable electronic device and generate the panoramic image using the obtained multiple images, when panoramic image generation is possible, even when the folding angle change of the foldable electronic device is not completed.

2. The foldable electronic device of claim 1, wherein the processor is further configured to:
    obtain a first image from the at least one first camera module and a second image from the at least one second camera module when the foldable electronic device changes to a first folding angle; and
    obtain a third image from the at least one first camera module and a fourth image from the at least one second camera module when the foldable electronic device changes to a second folding angle.

3. The foldable electronic device of claim 2, wherein the processor is further configured to generate the panoramic image by using at least one of the first image, the second image, the third image, and the fourth image.

4. The foldable electronic device of claim 1, further comprising:
    a second display disposed on the first housing to face the first direction,
    wherein the processor is further configured to display the panoramic images on the first display or the second display.

5. The foldable electronic device of claim 4, wherein the processor is further configured to:
    display the panoramic images through the first display when the foldable electronic device is unfolded; and
    display the panoramic images through the second display when the foldable electronic device is folded.

6. The foldable electronic device of claim 1,
    wherein the processor is further configured to start panoramic image capturing in response to the folding angle change.

7. The foldable electronic device of claim 1,
    wherein the at least one second camera module comprises at least one of a second camera module, a third camera module, and a fourth camera module, and
    the processor is further configured to:
    select the second camera module from of the at least one second camera module based on the at least one first camera module; and
    obtain the multiple images from the at least one first camera module and the selected second camera module.

8. The foldable electronic device of claim 7,
    wherein the processor is further configured to obtain the multiple images from at least one of the at least one first camera module, the second camera module, the third camera module, and the fourth camera module.

9. The foldable electronic device of claim 1, wherein the processor is further configured to:
    identically configure a camera attribute of the at least one first camera module and a camera attribute of the at least one second camera module; and
    obtain the multiple images from the at least one first camera module and the at least one second camera module.

10. The foldable electronic device of claim 1, wherein the processor is further configured to:
    receive an editing request from a user; and
    edit the panoramic images based on the editing request.

11. A method of a foldable electronic device comprising a first housing and a second housing foldable with the first housing, the method comprising:
- identifying, in response to a photographing request, a folding state of the foldable electronic device based on sensing data obtained from a sensor module of the foldable electronic device;
- sensing a folding angle change of the foldable electronic device based on the identified folding state;
- setting a first angle of view of at least one first camera module and the second angle of view of at least one second camera module to be identical with each other before performing photographing;
- obtaining, based on the folding angle change, multiple images from each of the at least one first camera module arranged on the first housing to face a first direction and the at least one second camera module arranged on the second housing to face the first direction; and
- generating and providing a panoramic image by removing an overlapping region from the obtained multiple images,
- wherein generating the panoramic image comprises:
- determining whether the folding angle change of the foldable electronic device is completed or whether panoramic image generation is possible; and
- stopping image obtaining according to the folding angle change of the foldable electronic device and generating the panoramic image using the obtained multiple images, when panoramic image generation is possible, even when the folding angle change of the foldable electronic device is not completed.

12. The method of claim 11, wherein obtaining the multiple images comprises:
- obtaining a first image from the at least one first camera module and a second image from the at least one second camera module when the foldable electronic device changes to a first folding angle; and
- obtaining a third image from the at least one first camera module and a fourth image from the at least one second camera module when the foldable electronic device changes to a second folding angle.

13. The method of claim 12,
wherein generating the panoramic image comprises generating the panoramic image by using at least one of the first image, the second image, the third image, and the fourth image.

14. The method of claim 11,
wherein providing the panoramic image comprises displaying the panoramic image on a first display disposed on the first housing to face a second direction opposite to the first direction and the second housing to face the second direction, or on a second display disposed on the first housing to face the first direction.

15. The method of claim 14, wherein the panoramic image is displayed through the first display when the foldable electronic device is unfolded, and is displayed through the second display when the foldable electronic device is folded.

16. The method of claim 11, further comprising controlling the at least one first camera module or the at least one second camera module such that panoramic image capturing starts in response to the folding angle change.

17. The method of claim 11, wherein the at least one second camera module comprises at least one of a second camera module, a third camera module, and a fourth camera module, and
- wherein obtaining the multiple images comprises:
- selecting the second camera module from the at least one second camera module based on the at least one first camera module; and
- obtaining the multiple images from the at least one first camera module and the selected second camera module.

18. The method of claim 11, wherein obtaining the multiple images comprises:
- identically configuring a camera attribute of the at least one first camera module and a camera attribute of the at least one second camera module; and
- obtaining the multiple images from the at least one first camera module and the at least one second camera module.

* * * * *